(12) United States Patent
Yang et al.

(10) Patent No.: US 11,803,214 B2
(45) Date of Patent: Oct. 31, 2023

(54) DISPLAY DEVICE

(71) Applicant: Samsung Display Co., LTD., Yongin-si (KR)

(72) Inventors: Dong Hyun Yang, Seongnam-si (KR); Sae Na Yun, Suwon-si (KR); Jin Sung Hwang, Daegu (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 277 days.

(21) Appl. No.: 17/227,984

(22) Filed: Apr. 12, 2021

(65) Prior Publication Data

US 2021/0397228 A1 Dec. 23, 2021

(30) Foreign Application Priority Data

Jun. 18, 2020 (KR) .................. 10-2020-0074080

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *H04M 1/0268* (2013.01)

(58) Field of Classification Search
CPC .... G06F 1/1616; G06F 1/1637; G06F 1/1652; G06F 1/1681
See application file for complete search history.

(56) References Cited

U.S. PATENT DOCUMENTS

| 9,348,450 | B1 | 5/2016 | Kim |
| 10,082,838 | B1 | 9/2018 | Hong et al. |
| 10,185,355 | B2 | 1/2019 | Watamura et al. |
| 2010/0201604 | A1 | 8/2010 | Kee et al. |
| 2015/0330614 | A1 | 11/2015 | Lee et al. |
| 2017/0060183 | A1* | 3/2017 | Zhang .................. G06F 1/1615 |
| 2017/0374749 | A1* | 12/2017 | Lee ........................ G06F 1/1616 |
| 2018/0242466 | A1 | 8/2018 | Lee et al. |
| 2018/0295735 | A1 | 10/2018 | Ahn |

(Continued)

FOREIGN PATENT DOCUMENTS

| EP | 3 489 795 | 5/2019 |
| EP | 3 770 726 | 1/2021 |

(Continued)

OTHER PUBLICATIONS

Partial European search report for European Patent Application or Patent No. 21180163.4 dated Nov. 23, 2021.

*Primary Examiner* — Anthony Q Edwards
(74) *Attorney, Agent, or Firm* — KILE PARK REED & HOUTTEMAN PLLC

(57) ABSTRACT

A display device includes a display panel including a front surface, a rear surface, and a folding axis; a support member disposed on the rear surface of the display panel, the support member including a first support member and a second support member; a hinge connected to the first support member and the second support member to each other; a hinge cover disposed over the hinge; a first rear cover disposed on a rear surface of the first support member; a second rear cover disposed on a rear surface of the second support member; a first blocking member disposed on a first cover surface of the first rear cover; and a second blocking member disposed on a second cover surface of the second rear cover.

22 Claims, 21 Drawing Sheets

(56) References Cited

U.S. PATENT DOCUMENTS

| | | | |
|---|---|---|---|
| 2021/0026412 A1* | 1/2021 | Lee | H05K 1/028 |
| 2021/0267073 A1* | 8/2021 | Fan | G06F 1/1616 |
| 2021/0357001 A1* | 11/2021 | DeMaio | G06F 1/1624 |
| 2022/0083098 A1* | 3/2022 | Hosokai | G06F 1/1616 |
| 2022/0192037 A1* | 6/2022 | Han | G06F 1/1652 |
| 2022/0247843 A1* | 8/2022 | Hu | G06F 1/1652 |
| 2022/0397943 A1* | 12/2022 | Hsiang | G06F 1/1681 |

FOREIGN PATENT DOCUMENTS

| | | |
|---|---|---|
| EP | 3 896 948 | 10/2021 |
| KR | 10-2015-0096827 | 8/2015 |

\* cited by examiner

DISPLAY DEVICE

CROSS-REFERENCE TO RELATED APPLICATION(S)

This application claims priority to and the benefit of Korean Patent Application No. 10-2020-0074080 under 35 U.S.C. § 119, filed in the Korean Intellectual Property Office (KIPO) on Jun. 18, 2020, the entire contents of which are incorporated herein by reference.

BACKGROUND

1. Technical Field

The disclosure relates to a display device.

2. Description of the Related Art

The importance of display devices has steadily increased with the development of multimedia technology. Accordingly, various types of display devices such as a liquid crystal display (LCD), an organic light emitting display (OLED) and the like have been used.

A mobile electronic device includes a display unit to provide images to a user. The market share of mobile electronic devices having the same or a smaller volume or thickness and a larger display screen than those of the conventional mobile electronic devices has increased. Further, a foldable display device or a bendable display device, which has a structure that can be folded and unfolded to provide a larger screen, has also been developed.

SUMMARY

Aspects of the disclosure provide a display device capable of blocking foreign substances introduced from the outside.

However, aspects of the disclosure are not restricted to the ones set forth herein. The above and other aspects of the disclosure will become more apparent to one of ordinary skill in the art to which the disclosure pertains by referencing the detailed description of the disclosure given below.

An embodiment of a display device may include a display panel including a front surface displaying an image; a rear surface opposite to the front surface of the display panel; and a folding axis; a support member disposed on the rear surface of the display panel, the support member including a first support member disposed on a side of the folding axis; and a second support member separated from the first support member and disposed on another side of the folding axis; a hinge connected to the first support member and the second support member; a hinge cover disposed over the hinge, and the hinge cover including a front surface facing the hinge; and a rear surface opposite to the front surface of the hinge cover; a first rear cover disposed on a rear surface of the first support member, the first rear cover including a first cover surface that covers a first area of the rear surface of the hinge cover in an unfolded state; a second rear cover disposed on a rear surface of the second support member, the second rear cover including a second cover surface that covers a second area of the rear surface of the hinge cover in the unfolded state; a first blocking member disposed on the first cover surface of the first rear cover, the first blocking member including a plurality of first protrusions; and a second blocking member disposed on the second cover surface of the second rear cover, the second blocking member including a plurality of second protrusions.

The first blocking member may include a first plate including a surface on which the plurality of first protrusions are disposed, and the second blocking member may include a second plate including a surface on which the plurality of second protrusions are disposed.

The display device may further comprise a first adhesive member disposed between another surface of the first plate and the first cover surface; and a second adhesive member disposed between another surface of the second plate and the second cover surface.

The plurality of first protrusions and the plurality of second protrusions may have a diameter equal to or less than about 0.5 mm.

The plurality of first protrusions and the plurality of second protrusions may form a plurality of rows in a direction, and protrusions of a first row among the plurality of rows and protrusions of a second row among the plurality of rows may be disposed alternately with each other.

A distance between the plurality of first protrusions may be equal to or less than a distance between the rear surface of the hinge cover and the first cover surface, and a distance between the plurality of second protrusions may be equal to or less than a distance between the rear surface of the hinge cover and the second cover surface.

Each of the distance between the plurality of first protrusions and the distance between the plurality of second protrusions may be equal to or less than about 1.0 mm.

The first blocking member may cover a gap between the rear surface of the hinge cover and the first cover surface, and the second blocking member may overlap a gap between the rear surface of the hinge cover and the second cover surface.

The plurality of first protrusions may have a height equal to or less than a distance between the rear surface of the hinge cover and the first cover surface, and the plurality of second protrusions may have a height equal to or less than a distance between the rear surface of the hinge cover and the second cover surface.

The plurality of first protrusions and the plurality of second protrusions may have a height equal to or less than about 1.5 mm.

The first blocking member may be disposed between the rear surface of the hinge cover and the first cover surface, and the second blocking member may be disposed between the rear surface of the hinge cover and the second cover surface.

The first cover surface and the second cover surface may include curved surfaces, respectively, and the first blocking member and the second blocking member may be curved corresponding to shapes of the curved surfaces of the first cover surface and the curved surface of the second cover surface, respectively.

The rear surface of the hinge cover may have a convex shape, and the first cover surface and the second cover surface may have a concave shape corresponding to the convex shape of the rear surface of the hinge cover.

The first blocking member and the second blocking member may include at least one of silicon or plastic.

The rear surface of the hinge cover may be exposed between the first rear cover and the second rear cover in a folded state.

An embodiment of a display device may include a display panel including a folding area, a first non-folding area disposed on a side of the folding area, and a second non-folding area disposed on another side of the folding area; a first cover disposed in the folding area; a second cover disposed in the first non-folding area, the second cover including a side adjacent to the first cover and separated from the first cover; a third cover disposed in the second non-folding area, the third cover including a side adjacent to the first cover and separated from the first cover; a first blocking member disposed on the side of the second cover and covering a gap between the first cover and the side of the second cover; and a second blocking member disposed on the side of the third cover and covering a gap between the first cover and the side of the third cover.

Each of the first blocking member and the second blocking member may include a plate and a plurality of protrusions protruding from a surface of the plate.

The plurality of protrusions may have a diameter equal to or less than about 0.5 mm.

The first cover may include a front surface facing the display panel and a rear surface opposite to the front surface of the first cover, the second cover may include a first cover surface covering a portion of the rear surface of the first cover, and the third cover may include a second cover surface covering another portion of the rear surface of the first cover.

The first blocking member may be disposed on the first cover surface of the second cover and cover a gap between the rear surface of the first cover and the first cover surface of the second cover, and the second blocking member may be disposed on the second cover surface of the third cover and cover a gap between the rear surface of the first cover and the second cover surface of the third cover.

An embodiment of a method of manufacturing a display device may include forming a plurality of protrusions on a surface of a plate; and attaching the plate to at least one cover covering a rear surface of a display module. The forming of the plurality of protrusions may comprise performing an injection molding or epitaxial growth to form the plurality of protrusions.

The display device according to various embodiments of the disclosure can prevent penetration of foreign substances from the outside.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The disclosure will now be described more fully hereinafter with reference to the accompanying drawings, in which some embodiments of the disclosure are shown. This disclosure may, however, be embodied in different forms and should not be construed as being limited to the embodiments set forth herein. Rather, these embodiments are provided so that this disclosure will be thorough and complete, and will convey the scope of the disclosure to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present. The same reference numbers indicate the same components throughout the specification. In the attached figures, the thickness of layers and regions may be exaggerated for clarity.

In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, some embodiments will be described in detail with reference to the accompanying drawings.

Figure 1:
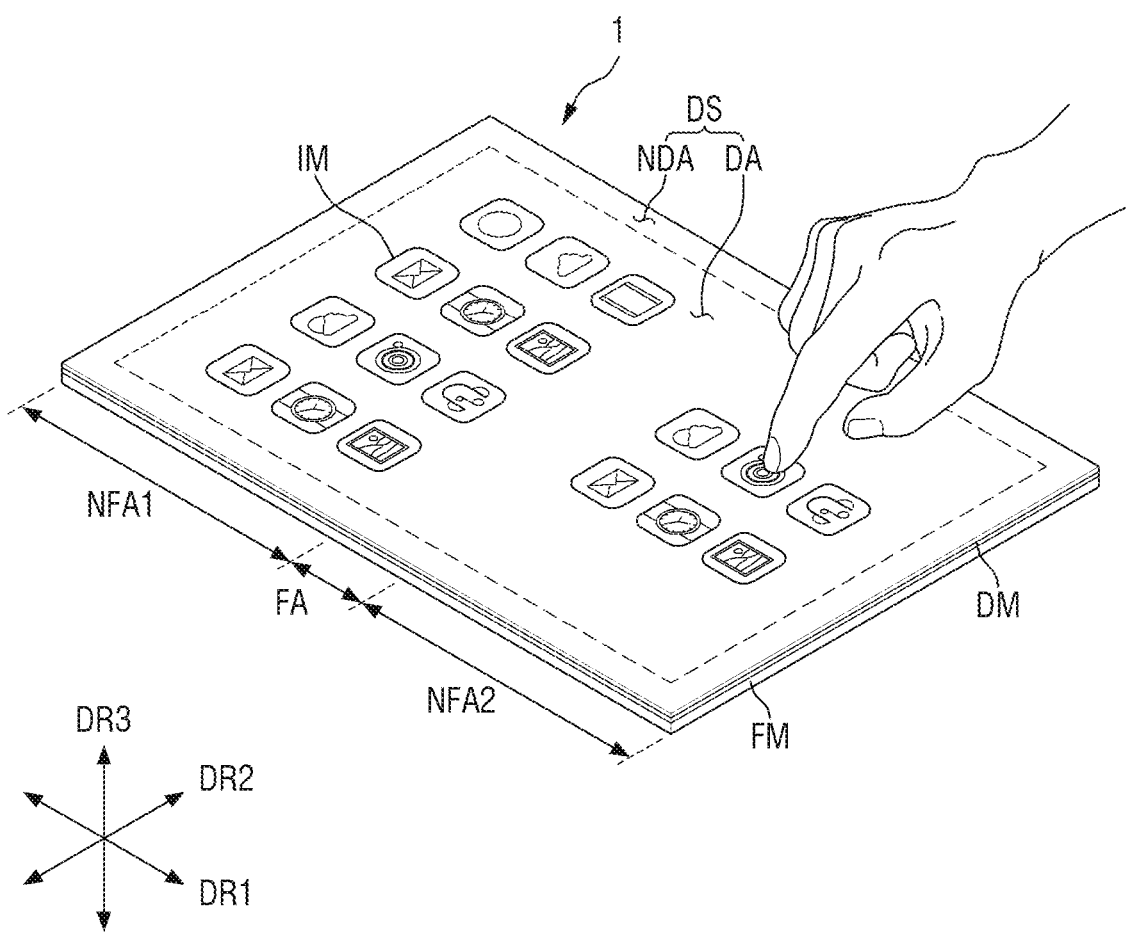
FIG. 1 is a schematic perspective view of a display device according to an embodiment.
Figure 2:
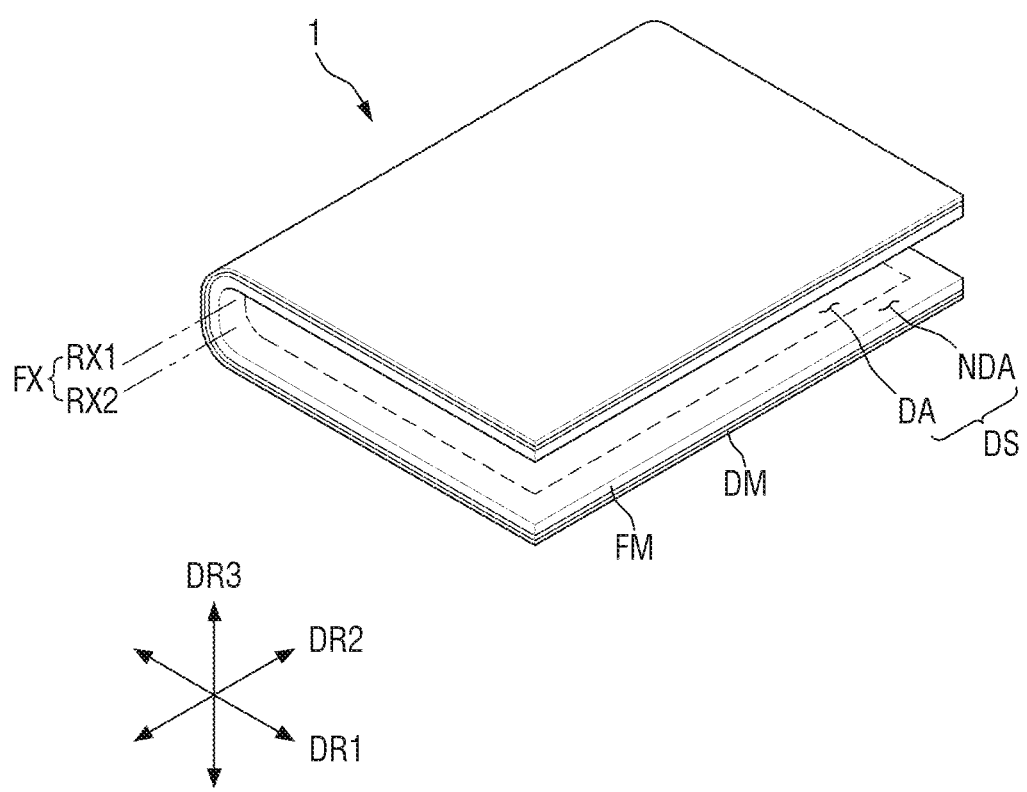
FIG. 2 is a schematic perspective view illustrating a display device according to an embodiment in a folded state.

FIG. 1 is a schematic perspective view of a display device according to an embodiment. FIG. 2 is schematic a perspective view illustrating a display device according to an embodiment in a folded state.

In the specification, a first direction DR1, a second direction DR2, and a third direction DR3 intersect each other. The first direction DR1 may be a vertical direction, the second direction DR2 may be a horizontal direction, and the third direction DR3 may be a thickness direction. The third direction DR3 may include a front direction toward the upper side of FIG. 1 and a rear direction toward the lower side of FIG. 1. A surface of the member facing upward may be referred to as a front surface, and the other surface of the member facing downward may be referred to as a rear surface. However, the above examples are relative, and the following embodiments are not limited to the above directions.

A display device 1 according to an embodiment of the disclosure may include various devices for displaying an image or video. Examples of the display device 1 may include, but are not limited to, a smartphone, a mobile phone, a tablet PC, a personal digital assistant (PDA), a portable multimedia player (PMP), a television, a game machine, a wristwatch-type electronic device, a head-mounted display, a monitor of a personal computer, a laptop computer, a car navigation system, a car's dashboard, a digital camera, a camcorder, an external billboard, an electronic billboard, various medical devices, various inspection devices, various appliances such as a refrigerator and a washing machine including a display portion DPA, an Internet of Things (IoT) device, and the like.

Referring to FIGS. 1 and 2, the display device 1 may have a rectangular shape including long sides in the first direction DR1 and short sides in the second direction DR2 in a plan view. However, the shape of the display device 1 is not limited thereto, and the display device 1 may have various shapes such as a square shape, a circular shape, or a rhombic shape.

The display device 1 may include a display surface DS. The display surface DS may provide an image to a user. At least one surface of the display device 1 may be the display surface DS. In an embodiment, the display surface DS of the display device 1 may be the front surface of the display device 1 but is not limited thereto. In some embodiments, the display surface DS of the display device 1 may include side and/or rear surfaces of the display device 1.

The display surface DS may include a display area DA and a non-display area NDA. The display area DA displays an image IM. The display area DA may be disposed over a first non-folding area NFA1, a second non-folding area NFA2, and a folding area FA, which will be described below. The non-display area NDA does not display an image IM. The non-display area NDA may be disposed around the display area DA. In an embodiment, the display area DA may be disposed on a top surface of the display device 1 in a rectangular shape, and the non-display area NDA may be disposed to surround the display area DA.

The display device 1 may include a folding area FA, a first non-folding area NFA1, and a second non-folding area NFA2. The folding area FA is an area that is folded or bent as the display device 1 is folded. The first non-folding area NFA1 and the second non-folding area NFA2 are areas that are not folded or bent in case that the display device 1 is folded. In an embodiment, the first non-folding area NFA1, the folding area FA, and the second non-folding area NFA2 may be sequentially disposed in the first direction DR1 but are not limited thereto.

The display device 1 may be a foldable device. The display device 1 may be folded or unfolded. Specifically, the display device 1 may be folded such that a portion of the display device 1 overlaps the other portion (or another) thereof or is inclined with respect to the other portion, or the display device 1 may be unfolded to be entirely flat. The portion of the display device 1 may be a portion disposed in the first non-folding area NFA1, and the other portion of the display device 1 may be a portion disposed in the second non-folding area NFA2, but the disclosure is not limited thereto. The portion of the display device 1 and/or the other portion of the display device 1 may include a portion disposed in the folding area FA.

The display device 1 may be fully folded such that the angle between the portion and the other portion of the display device 1 is about 0 or about 360 degrees, may be partially folded such that the angle between the portion and the other portion of the display device 1 is greater than about 0 degrees and less than 180 degrees, or may be unfolded such that the angle between the portion and the other portion of the display device 1 is about 180 degrees.

The display device 1 may be in-folded. The in-folding may mean that a portion of the display surface DS of the display device 1 is folded to face the other portion (or another portion) of the display surface DS. In some embodiments, the display device 1 may be out-folded. The out-folding may mean that a portion of the opposite surface of the display surface DS, e.g., the rear surface of the display device 1, is folded to face the other portion of the opposite surface. In some embodiments, the display device 1 may be in-folded and out-folded.

The display device 1 may be in a folded state and an unfolded state. The folded state may be a state in which a portion of the display device 1 is bent to be inclined with respect to the other portion (or another portion). The folded state may include a first folded state and a second folded state. The first folded state may be a state in which the display device 1 is bent. In the first folded state, the angle between the portion and the other portion of the display device 1 may be greater than about 0 degrees and less than about 180 degrees or greater than about 180 degrees and less than about 360 degrees. The second folded state may be a state in which the display device 1 is completely folded. In the second folded state, the angle between the portion and the other portion of the display device 1 may be about 0 degrees and/or about 360 degrees. The unfolded state may be a state in which the display device 1 is completely unfolded, and the portion of the display device 1 is disposed side by side with the other portion on a plane. In the unfolded state, the angle between the portion and the other portion of the display device 1 may be about 180 degrees. In an embodiment, the display device 1 may be freely switched between the folded state and/or the unfolded state.

The display device 1 may stop movement of the portion and/or the other portion of the display device 1 at an arbitrary angle during an operation for switching between the folded state and/or the unfolded state and may maintain the arbitrary angle. The arbitrary angle may be the angle between the portion of the display device 1 formed and the other portion of the display device 1 in the folded and/or unfolded state.

The display device 1 may be folded or unfolded with respect to a folding axis FX. In an embodiment, the display device 1 may be folded or unfolded with respect to the folding axis FX disposed in the first direction DR1, but the disclosure is not limited thereto.

The folding axis FX may include at least one rotation axis. FIG. 2 illustrates two rotation axes RX1 and RX2 as an example, but the disposition and number of at least one rotation axis are not limited thereto.

The display device 1 may include a flexible display module DM and a folding member FM disposed under the display module DM to support the display module DM.

The display module DM is disposed on the display surface DS of the display device 1. The display module DM may be disposed over the first non-folding area NFA1, the folding area FA, and the second non-folding area NFA2 of the display device 1. The display module DM may be folded or unfolded as the folding member FM is folded or unfolded. In an embodiment, the display module DM may have a long rectangular shape in the first direction DR1 in a plan view, but the embodiments are not limited thereto.

Figure 3:
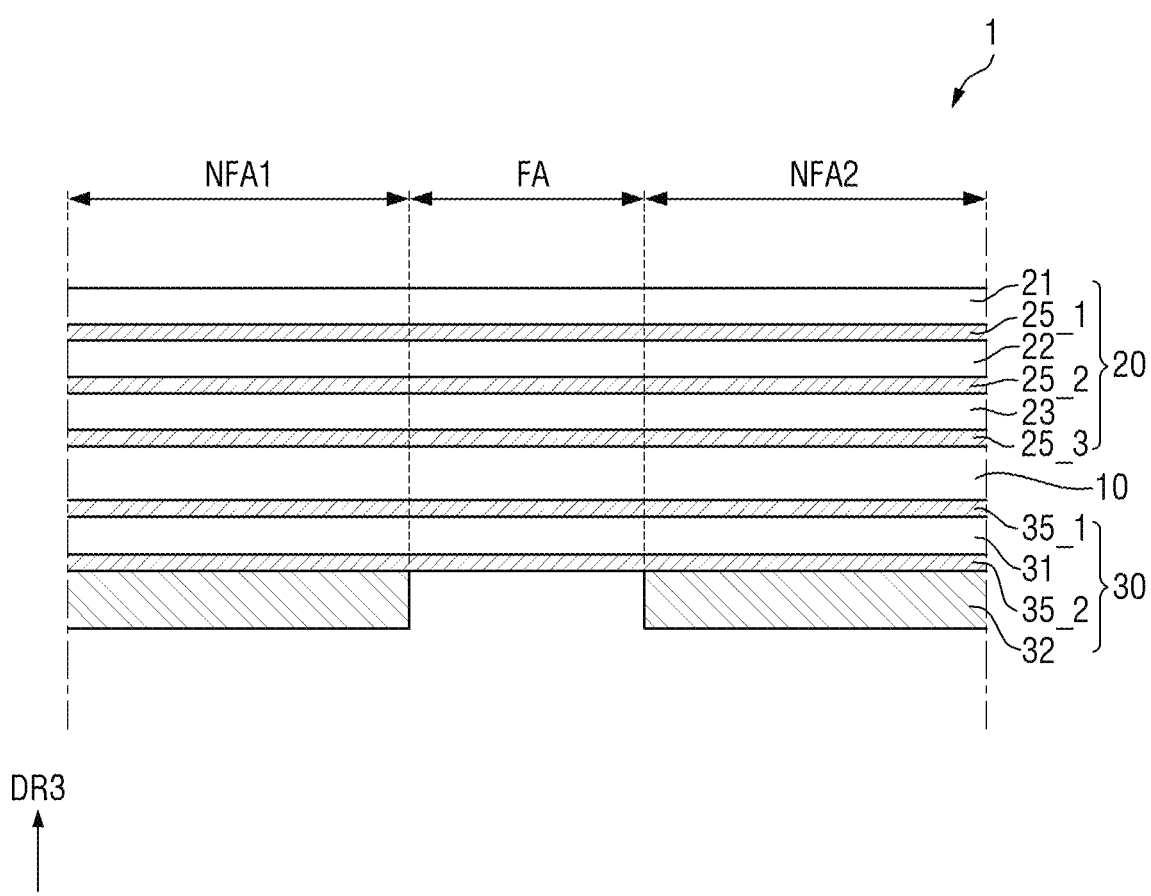
FIG. 3 is a schematic cross-sectional view of a display module of a display device according to an embodiment.
Figure 4:
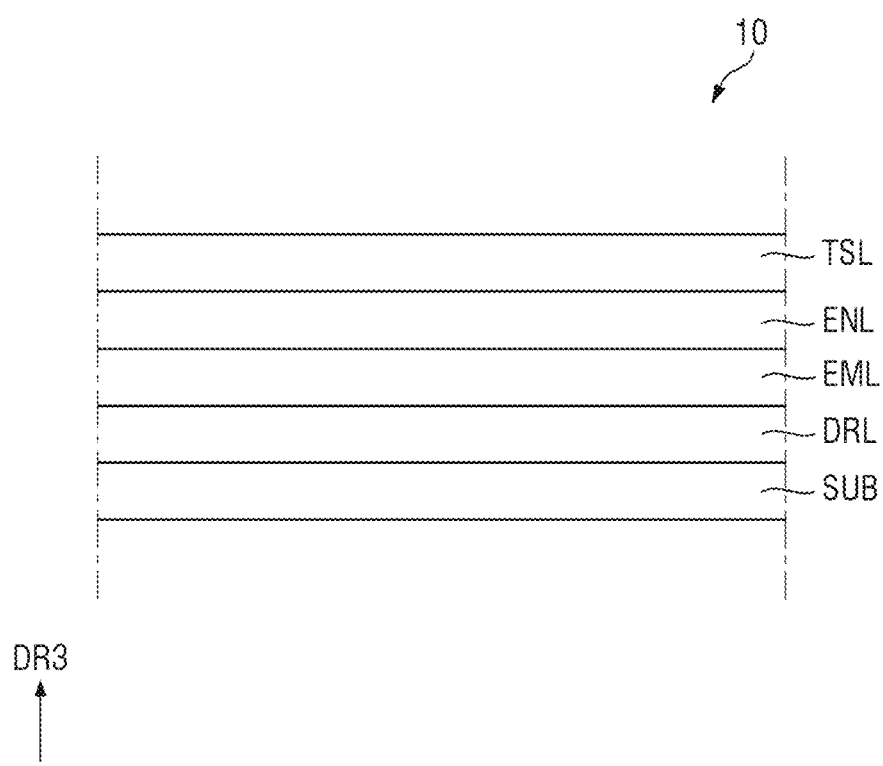
FIG. 4 is a schematic cross-sectional view of a display panel of a display device according to an embodiment.

FIG. 3 is a schematic cross-sectional view of a display module DM of a display device 1 according to an embodiment. FIG. 4 is a schematic cross-sectional view of a display panel 10 of a display device 1 according to an embodiment.

Referring to FIGS. 3 and 4, the display module DM may include a display panel 10, a front stacked structure 20, and a rear stacked structure 30. In an embodiment, the display panel 10 may display an image IM in a direction in which the front stacked structure 20 is positioned. The display panel 10, the front stacked structure 20, and the rear stacked structure 30 may be folded or unfolded as the display device 1 is folded or unfolded.

The display panel 10 may be a panel for displaying an image IM or a video. Examples of the display panel 10 may include not only a self-luminous display panel such as an organic light emitting display (OLED) panel, an inorganic electroluminescence (EL) display panel, a quantum dot (QED) display panel, a micro-LED display panel, a nano-LED display panel, a plasma display panel (PDP), a field emission display (FED) panel, and a cathode ray tube (CRT) display panel, but also a light receiving display panel such as a liquid crystal display (LCD) panel and an electrophoretic display (EPD) panel. Hereinafter, an organic light emitting display panel will be described as an example of the display panel 10, and the organic light emitting display panel applied to the embodiment will be referred to as the display panel 10 unless otherwise specified. However, the embodiment is not limited to the organic light emitting display panel, and other display panels 10 mentioned above or known in the art may be applied within the scope of the same technical ideas.

The display panel 10 may further include a touch member. The touch member may be provided as a panel or film separate from the display panel 10 and attached to the display panel 10 but may also be provided as a touch layer inside the display panel 10. In the following embodiments, the touch member is illustrated as being included in the display panel 10, but the disclosure is not limited thereto.

Figure 5:
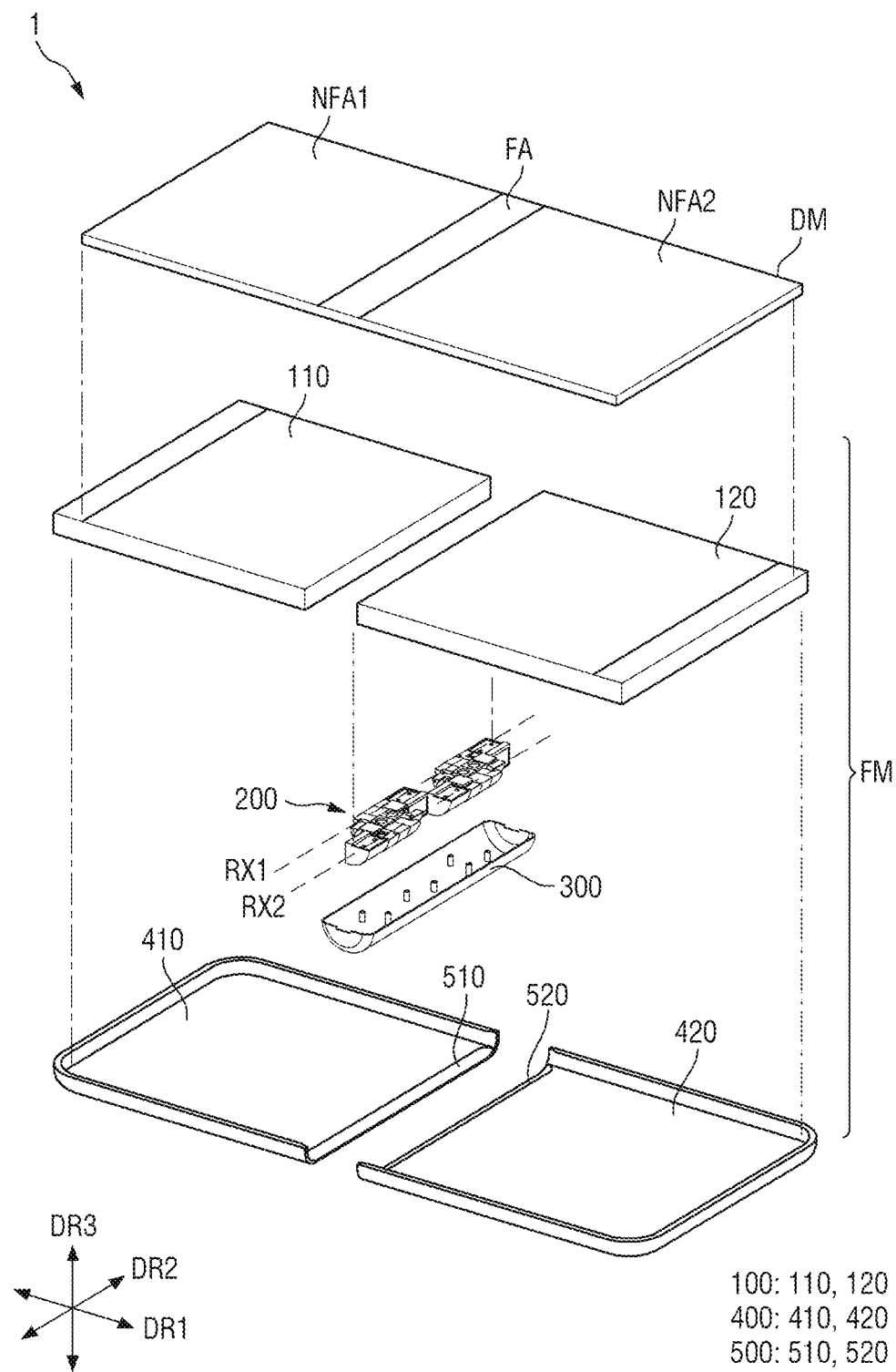
FIG. 5 is a schematic exploded perspective view of a display device according to an embodiment.

Referring to FIGS. 4 and 5, the display panel 10 may include a substrate SUB, a circuit driving layer DRL on the substrate SUB, a light emitting layer EML on the circuit driving layer DRL, and an encapsulation layer ENL on the light emitting layer EML, and a touch layer TSL on the encapsulation layer ENL.

The substrate SUB may be a flexible substrate including a flexible polymer material such as polyimide. Accordingly, the display panel 10 can be twisted, bent, folded, or rolled. In some embodiments, the substrate SUB may include sub-substrates overlapping each other in a thickness direction with a barrier layer interposed therebetween. Each of the sub-substrates may be a flexible substrate.

The circuit driving layer DRL may be disposed on the substrate SUB. The circuit driving layer DRL may include a circuit that drives the light emitting layer EML of a pixel. The circuit driving layer DRL may include thin film transistors.

The light emitting layer EML may be disposed on the circuit driving layer DRL. The light emitting layer EML may include an organic light emitting layer. The light emitting layer EML may emit light at various luminance levels according to a driving signal transmitted from the circuit driving layer DRL.

The encapsulation layer ENL may be disposed on the light emitting layer EML. The encapsulation layer ENL may include an inorganic layer or a laminated or stacked layer of an inorganic layer and an organic layer.

The touch layer TSL may be disposed on the encapsulation layer ENL. The touch layer TSL is a layer for recognizing or sensing a touch input and may function as a touch member. The touch layer TSL may include sensing areas and sensing electrodes.

Referring back to FIG. 3, the front stacked structure 20 may be disposed on the display panel 10. The front stacked structure 20 may include a polarization member 23, a cover window 22, and a cover window protective layer 21, which are sequentially stacked forward from the display panel 10.

The polarization member 23 may polarize the light passing therethrough. The polarization member 23 may reduce the reflection of external light. In an embodiment, the polarization member 23 may be a polarizing film. The polarizing film may include a polarizing layer and protective substrates sandwiching the polarizing layer on the front and rear sides thereof. The polarizing layer may include a polyvinyl alcohol film. The polarizing layer may be stretched in a direction. The stretching direction of the polarizing layer may be an absorption axis, and a direction perpendicular thereto may be a transmission axis. The protective substrates may be disposed on a surface and another surface of the polarizing layer, respectively. The protective substrates may be made of a cellulose resin such as triacetyl cellulose, a polyester resin, or the like, but are not limited thereto.

The cover window 22 may be disposed on the polarization member 23. The cover window 22 may serve to protect the display panel 10. The cover window 22 may include (or be made of) a transparent material. The cover window 22 may include, for example, glass or plastic.

In case that the cover window 22 includes glass, the glass may be ultra-thin glass (UTG) or thin glass. In case that the glass is ultra-thin glass or thin glass, it may have a flexible property such that it can be bent, folded, or rolled. The thickness of the glass may be, for example, in the range of about 10 μm to about 300 μm, particularly, about 30 μm to about 80 μm or about 50 μm. The glass of the cover window 22 may include soda-lime glass, alkali aluminosilicate glass, borosilicate glass, or lithium alumina silicate glass. The glass of the cover window 22 may include chemically or thermally strengthened glass to have strong rigidity. Chemical strengthening may be achieved by an ion exchange process in alkaline salts. The ion exchange process may be performed two or more times.

In case that the cover window 22 includes plastic, it may be more advantageous to exhibit flexible properties such as folding. Examples of plastics applicable to the cover window 22 may include, but are not limited to, polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymer, polyethersulphone (PES), polyetherimide (PEI), polyphenylene sulfide (PPS), polyarylate (PAR), triacetyl cellulose (TAC), and cellulose acetate propionate (CAP). The cover window 22 made of plastic may include one or more of the plastic materials mentioned above.

The cover window protective layer 21 may be disposed on the cover window 22. The cover window protective layer 21 may perform at least one function of preventing scattering, absorbing impacts, preventing scratch, preventing fingerprint smudges, and preventing glare on the cover window 22. The cover window protective layer 21 may include a transparent polymer film. The transparent polymer film may include at least one of polyethylene terephthalate (PET), polyethylene naphthalate (PEN), polyether sulfone (PES), polyimide (PI), polyarylate (PAR), polycarbonate (PC), polymethyl methacrylate (PMMA), or cycloolefin copolymer (COC).

The front stacked structure 20 may include front bonding members 25_1, 25_2, and 25_3 for bonding adjacently stacked members. For example, a first bonding member 25_1 may be disposed between the cover window protective layer 21 and the cover window 22 to bond the cover window protective layer 21 and the cover window 22, a second bonding member 25_2 may be disposed between the cover window 22 and the polarization member 23 to bond the cover window 22 and the polarization member 23. A third bonding member 25_3 may be disposed between the polarization member 23 and the display panel 10 to bond the polarization member 23 and the display panel 10. For example, the front bonding members 25_1, 25_2, and 25_3 may be members that attach the layers to a surface of the display panel 10. The first bonding member 25_1 may be a protective layer bonding member for attaching the cover window protective layer 21, the second bonding member 25_2 may be a window bonding member for attaching the cover window 22, and the third bonding member 25_3 may be a polarizing portion bonding member for attaching the polarization member 23. The front bonding members 25_1, 25_2, and 25_3 may be optically transparent.

The rear stacked structure 30 may be disposed under the display panel 10. The rear stacked structure 30 may include a polymer film layer 31 and a heat dissipation member 32, which are sequentially stacked rearward from the display panel 10.

The polymer film layer 31 may include a polymer film. The polymer film layer 31 may include, for example, polyimide (PI), polyethylene terephthalate (PET), polycarbonate (PC), polyethylene (PE), polypropylene (PP), polysulfone (PSF), polymethylmethacrylate (PMMA), triacetylcellulose (TAC), cycloolefin polymer (COP) or the like. The polymer film layer 31 may include a functional layer FL on at least one surface thereof. The functional layer FL may include, for example, a light absorbing layer. The light absorbing layer may include a light absorbing material such as a black pigment or dye. The light absorbing layer may be formed by coating or printing black ink on a polymer film.

The heat dissipation member 32 may be disposed under the polymer film layer 31. The heat dissipation member 32 may diffuse heat generated from the display panel 10 or other components of the display device 1. The heat dissipation member 32 may be a heat dissipation sheet including graphite, carbon nanotubes, or the like. In an embodiment, the heat dissipation members 32 may be separated by the folding area FA to facilitate folding of the display device 1 as illustrated in FIGS. 3 and 4. In some embodiments, the heat dissipation members 32 may be connected as a body or be integral with each other.

The rear stacked structure 30 may include rear bonding members 35_1 and 35_2 for bonding adjacently stacked members. For example, a fourth bonding member 35_1 may be disposed between the display panel 10 and the polymer film layer 31 to bond the display panel 10 and the polymer film layer 31, and a fifth bonding member 35_2 may be disposed between the polymer film layer 31 and the heat dissipation member 32 to bond the polymer film layer 31 and the heat dissipation member 32.

In some embodiments, the rear stacked structure 30 may further include a buffer member. The buffer member may be disposed, for example, between the polymer film layer 31 and the heat dissipation member 32.

Figure 6:
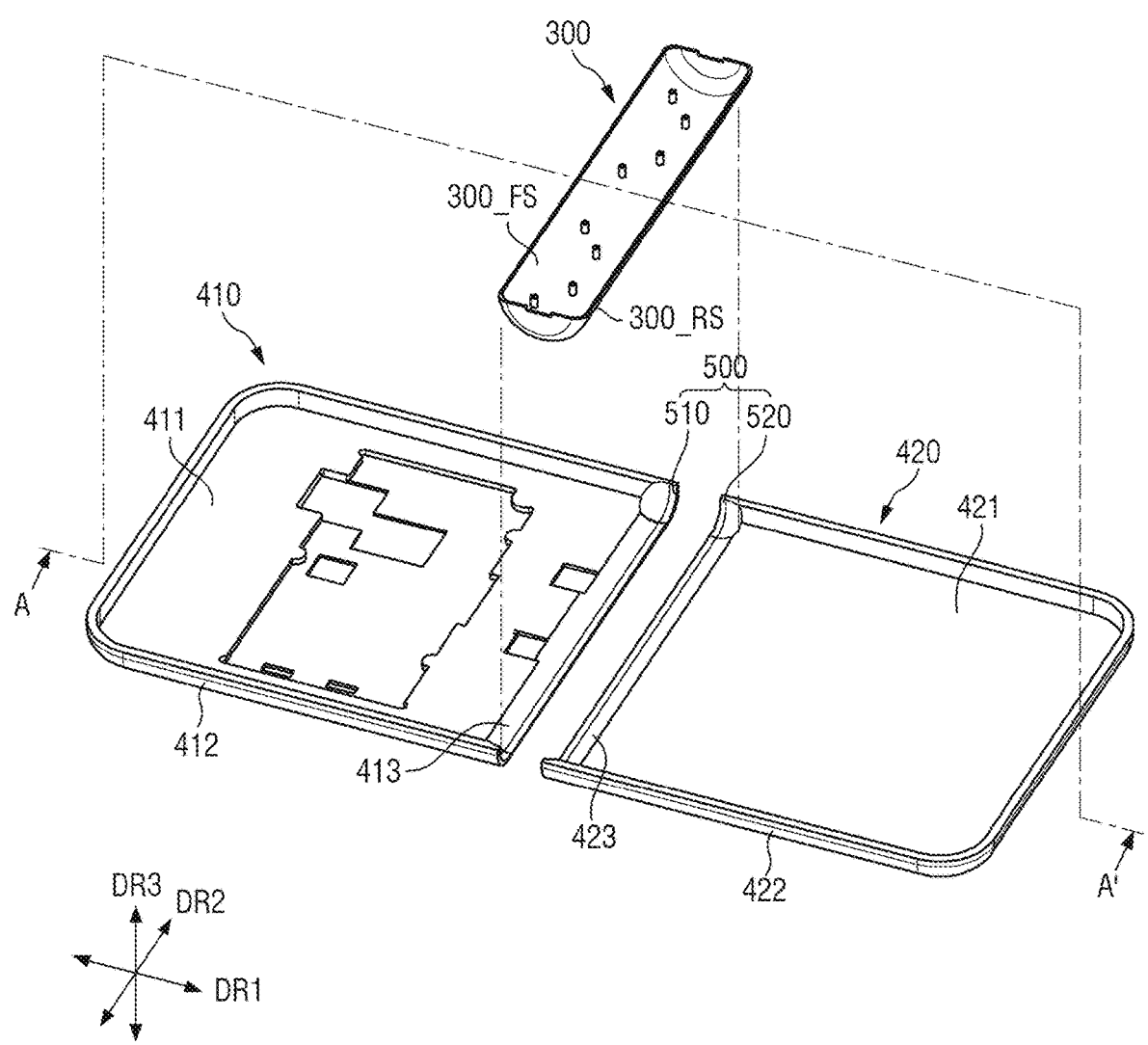
FIG. 6 is a schematic exploded perspective view of a hinge cover, a first rear cover, and a second rear cover of a display device according to an embodiment.
Figure 7:
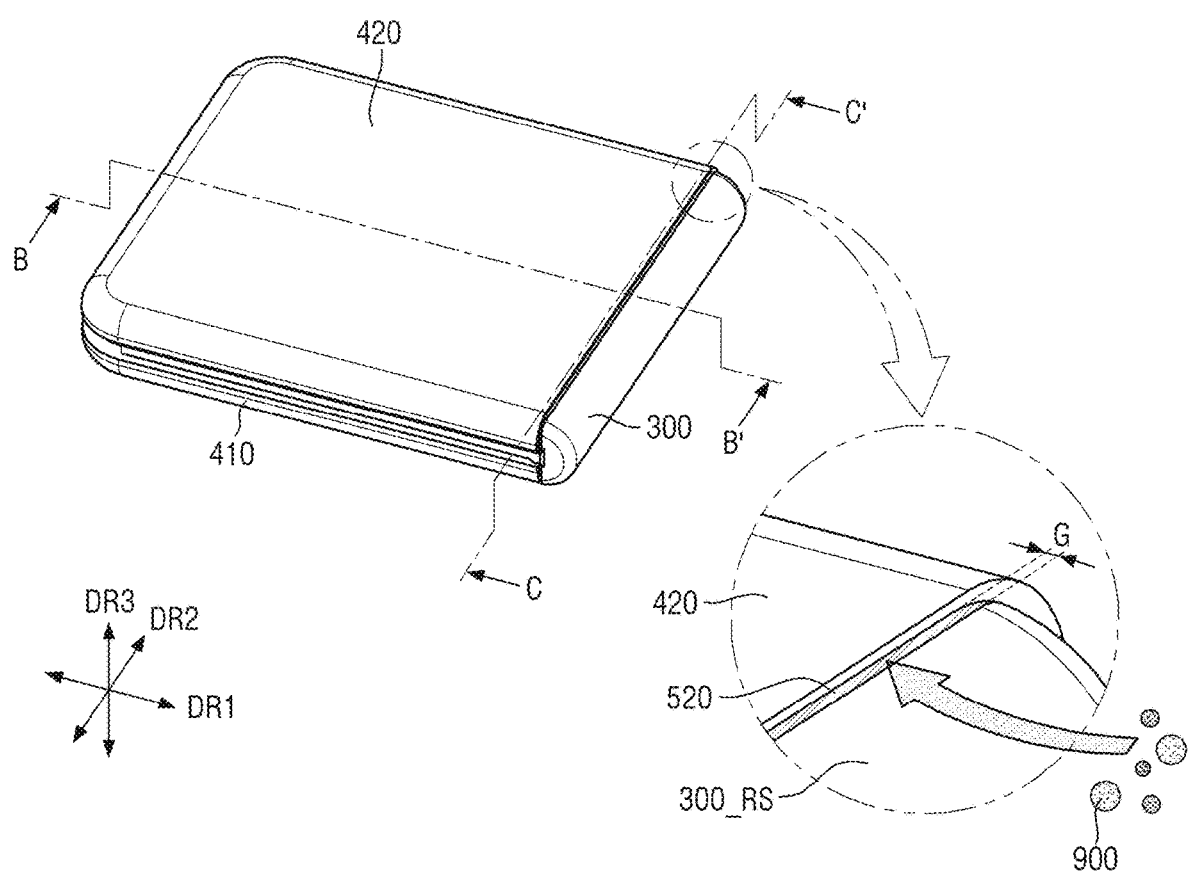
FIG. 7 is a schematic perspective view of a display device according to an embodiment in a folded state.

FIG. 5 is a schematic exploded perspective view of a display device 1 according to an embodiment. FIG. 6 is a schematic exploded perspective view of a hinge cover, a first rear cover, and a second rear cover of a display device 1 according to an embodiment. FIG. 7 is a schematic perspective view of a display device 1 according to an embodiment in a folded state.

Referring to FIGS. 1 to 7, as described above, the display device 1 may include the display module DM and the folding member FM.

The folding member FM may include a first support member 110, a second support member 120, a hinge 200, a hinge cover 300, and rear covers 400 including a first rear cover 410 and a second rear cover 420.

In some embodiments, the hinge cover 300, the first rear cover 410, and the second rear cover 420 may be referred to as a first cover, a second cover, and a third cover, respectively.

The first support member 110 and the second support member 120 may be disposed under the display module DM. The first support member 110 and the second support member 120 may be sequentially disposed on the bottom surface of the display module DM in the first direction DR1. The first support member 110 and the second support member 120 may be disposed symmetrically with respect to the folding area FA or the folding axis FX. The first support member 110 may be disposed in the first non-folding area NFA1, and the second support member 120 may be disposed in the second non-folding area NFA2. A portion of the first support member 110 and/or the second support member 120 may be disposed over the folding area FA. The first support member 110 and the second support member 120 may have the same shape and/or size or may have different shapes and/or sizes. In an embodiment, the first support member 110 and the second support member 120 may have a substantially rectangular shape in a plan view, but the embodiments are not limited thereto. The first support member 110 and the second support member 120 may include a metal plate.

The hinge 200 may connect the first support member 110 and the second support member 120 to each other. The hinge 200 may be disposed to overlap the folding axis FX in the thickness direction. The hinge 200 may be disposed in the folding area FA. The hinge 200 may be disposed over the first non-folding area NFA1, the second non-folding area NFA2, and the folding area FA. The hinge 200 may provide rotation axes. The first support member 110 may be rotatably connected to a side of the hinge 200 with respect to the first rotation axis RX1, and the second support member 120 may be rotatably connected to another side of the hinge 200 with respect to the second rotation axis RX2. Multiple hinges 200 may be disposed in the first direction DR1. The hinge 200 may include a first hinge 200_1 and a second hinge 200_2 disposed in the first direction DR1.

The hinge cover 300 may be disposed on the rear side of the hinge 200 to cover or overlap the rear surface of the hinge 200. The hinge cover 300 may have a lid shape that accommodates the hinge 200 on an open side thereof. The hinge cover 300 may have a substantially rectangular shape elongated in the first direction DR1 in a plan view. The hinge cover 300 may have a shape corresponding to the outer surface of the hinge 200, for example, the rear surface of the hinge 200.

The hinge cover 300 may include a front surface 300_FS facing the hinge 200 and having a concave or recessed shape, and a rear surface 300_RS opposite to the front surface 300_FS. The hinge 200 may be accommodated in the front surface 300_FS of the hinge cover 300.

The first rear cover 410 may be disposed on the rear side of the first support member 110. The first rear cover 410 may overlap the first support member 110 in the thickness direction. The first rear cover 410 may overlap or cover the rear surface of the first support member 110. The first rear cover 410 may be disposed over the first support member 110 and the hinge 200. The first rear cover 410 may be disposed in the first non-folding area NFA1. The first rear cover 410 may be disposed over the first non-folding area NFA1 and the folding area FA. The first rear cover 410 may have a substantially rectangular shape in a plan view. Corners of the first rear cover 410 may be rounded. The first rear cover 410 may be empty inside or may be fastened with the first support member 110 to form an empty space between the first rear cover 410 and the first support member 110. The first rear cover 410 may include a front surface 411 having a rectangular shape and three sidewalls 412 disposed at edges of the front surface 411 to surround the front surface 411 and protruding forward. For example, a side of the first rear cover 410 adjacent to the hinge 200 and/or the hinge cover 300 may be open without a sidewall.

The second rear cover 420 may be disposed on the rear side of the second support member 120. The second rear cover 420 may overlap the second support member 120 in the thickness direction. The second rear cover 420 may overlap or cover the rear surface of the second support member 120. The second rear cover 420 may be disposed over the second support member 120 and the hinge 200. The second rear cover 420 may be disposed in the second non-folding area NFA2. The second rear cover 420 may be disposed over the second non-folding area NFA2 and the folding area FA. The second rear cover 420 may have a substantially rectangular shape in a plan view. Corners of the second rear cover 420 may be rounded. The second rear cover 420 may be empty inside or may be fastened with the second support member 120 to form an empty space between the second rear cover 420 and the second support member 120. The second rear cover 420 may include a front surface 421 having a rectangular shape and three sidewalls 422 disposed at edges of the front surface 421 to surround the front surface 421 and protruding forward. For example, a side of the second rear cover 420 adjacent to the hinge 200 and/or the hinge cover 300 may be open without a sidewall.

The first rear cover 410 and the second rear cover 420 may cover the hinge cover 300. For example, at least a portion of the first rear cover 410 and the second rear cover 420 may overlap a portion of the hinge cover 300 in the thickness direction. In detail, the first rear cover 410 may overlap or cover a portion of the rear surface 300_RS of the hinge cover 300, and the second rear cover 420 may overlap or cover another portion of the rear surface 300_RS of the hinge cover 300. In an embodiment, in case that the display device 1 is unfolded, the first rear cover 410 and the second rear cover 420 may cover or overlap the hinge cover 300, and in case that the display device 1 is folded, the first rear cover 410 and the second rear cover 420 may not cover the hinge cover 300. In some embodiments, in case that the display device 1 is folded or unfolded, the first rear cover 410 and the second rear cover 420 may cover at least a portion of the hinge cover 300. In this case, the area of the hinge cover 300 covered by the first rear cover 410 and the second rear cover 420 in case that the display device 1 is folded may be smaller than the area of the hinge cover 300 covered by the first rear cover 410 and the second rear cover 420 in case that the display device 1 is unfolded.

The first rear cover 410 and the second rear cover 420 may further include a first cover surface 413 that overlaps or covers a portion of the rear surface 300_RS of the hinge cover 300, and a second cover surface 423 that overlaps or covers another portion of the rear surface 300_RS of the hinge cover 300, respectively.

The first cover surface 413 and the second cover surface 423 may be disposed on a side of the first rear cover 410 and a side of the second rear cover 420, respectively, the sides of the first and second rear cover 410, 420 being adjacent to the hinge 200. In detail, the side of the first rear cover 410 and the side of the second rear cover 420 may extend in the second direction DR2, and the first cover surface 413 and the second cover surface 423 may be elongated in the second direction DR2 along the side of the first rear cover 410 and the side of the second rear cover 420, respectively. The first cover surface 413 may be a portion of the front surface 411 of the first rear cover 410, and the second cover surface 423 may be a portion of the front surface 421 of the second rear cover 420. The first cover surface 413 and the second cover surface 423 may have a concave (or recessed) shape corresponding to the rear surface 300_RS of the hinge cover 300.

The display device 1 may further include blocking members 500 including a first blocking member 510 disposed on the first rear cover 410 and a second blocking member 520 disposed on the second rear cover 420.

The first blocking member 510 and the second blocking member 520 may be adjacent to the hinge 200 and disposed on a side of the first rear cover 410 and a side of the second rear cover 420 extending in the second direction DR2, respectively. In an embodiment, the first blocking member 510 may be disposed on the first cover surface 413, and the second blocking member 520 may be disposed on the second cover surface 423. The first blocking member 510 may extend in the second direction DR2 along the side of the first rear cover 410, and the second blocking member 520 may extend in the second direction DR2 along the side of the second rear cover 420. At least a portion of the side of the first rear cover 410 and at least a portion of the side of the second rear cover 420 may be spaced apart from the hinge 200. In an embodiment, the hinge 200 may be connected to the side of the first support member 110 and the side of the second support member 120, and the hinge cover 300 may be connected to the hinge 200, but the first rear cover 410 and the second rear cover 420 may be completely spaced apart from the hinge cover 300.

As illustrated in FIG. 7, the first blocking member 510 and the second blocking member 520 may block foreign substances introduced from the outside of the display device 1.

In detail, in case that the display device 1 is folded, at least a portion of the rear surface 300_RS of the hinge cover 300 may be exposed to the outside between the first rear cover 410 and the second rear cover 420. In an embodiment, as the angle between the first support member 110 and the second support member 120 and/or the angle between the first rear cover 410 and the second rear cover 420 becomes smaller, the exposed area of the hinge cover 300 may become greater. The angle may be an angle on the side where the display module DM or the display surface DS is positioned.

As the rear surface 300_RS of the hinge cover 300 is exposed to the outside, a gap G between the first rear cover 410 and the hinge cover 300 and a gap G between the second rear cover 420 and the hinge cover 300 may be exposed to the outside. Specifically, the display device 1 may be designed such that the gap G is formed between the first rear cover 410 and the hinge cover 300 and between the second rear cover 420 and the hinge cover 300. This may prevent generation of the friction between the first and second rear covers 410 and 420 and the hinge cover 300 during the folding operation of the display device 1. For example, the width of the gap G may be about 0.1 mm to about 2.0 mm. AS another example, the width of the gap G may be about 1.5 mm.

In case that foreign substances 900 such as dust or sand are introduced into the display device 1 through the gap G in the direction of the arrow illustrated in FIG. 7, a breakdown or malfunction of the display device 1 may be caused. For example, referring to FIG. 4, the foreign substances 900 penetrating into the display device 1 may pass through the gap G between the first support member 110 and the second support member 120, and may penetrate between the display module DM and the first support member 110 and/or between the display module DM and the second support member 120. The foreign substances 900 may cause the surface of the display module DM to wrinkle with their volumes and may cause a malfunction of the display module DM.

In the display device 1 according to an embodiment, the first blocking member 510 and the second blocking member 520 are disposed between the first rear cover 410 and the hinge cover 300 and between the second rear cover 420 and the hinge cover 300, respectively, thereby blocking the foreign substances 900 introduced from the outside of the display device 1.

Hereinafter, the first blocking member 510 and the second blocking member 520 will be described in detail with reference to FIGS. 8 to 18. In FIGS. 8 to 18, the illustration of the hinge 200 is simplified or omitted for the convenience of description.

Figure 8:
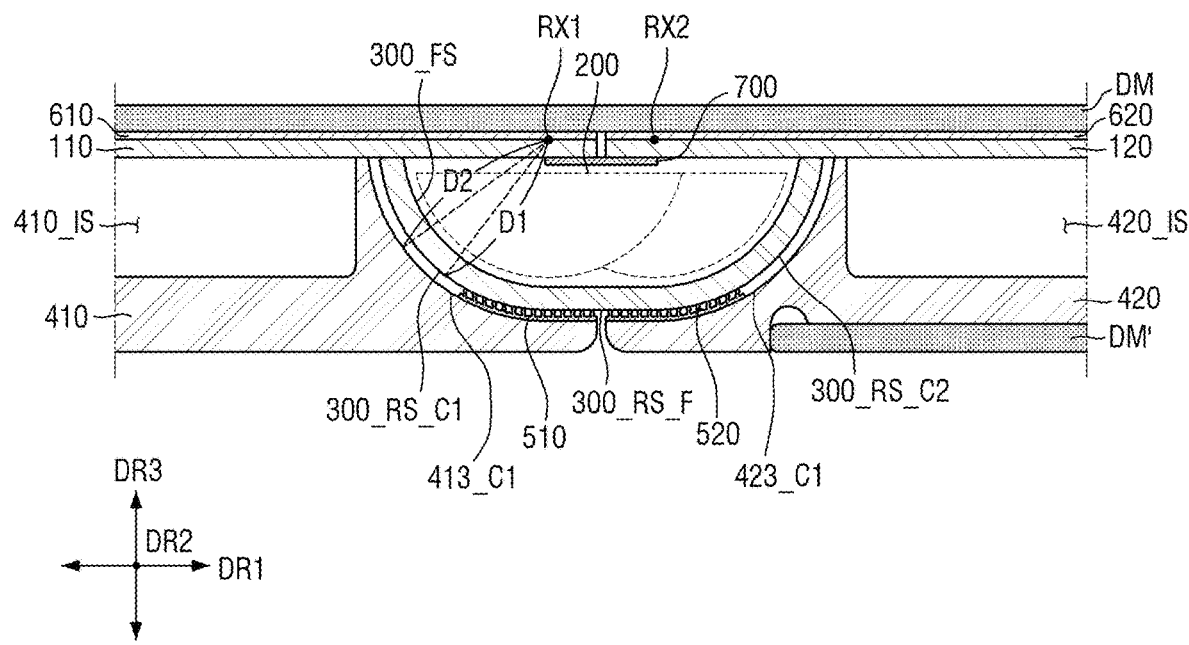
FIG. 8 is a schematic cross-sectional view taken along line A-A' of FIG. 6.
Figure 9:
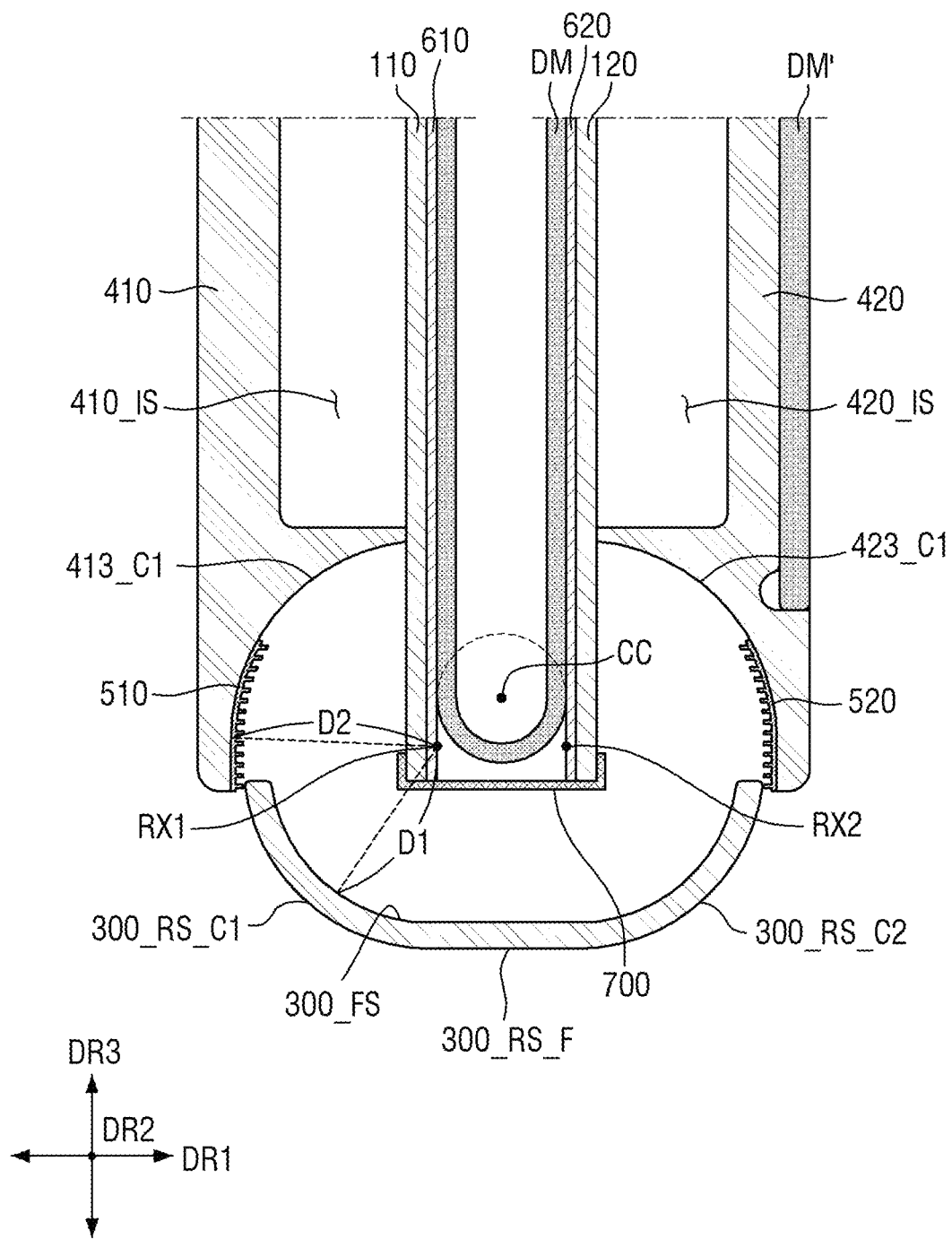
FIG. 9 is a schematic cross-sectional view taken along line B-B' of FIG. 7.
Figure 10:
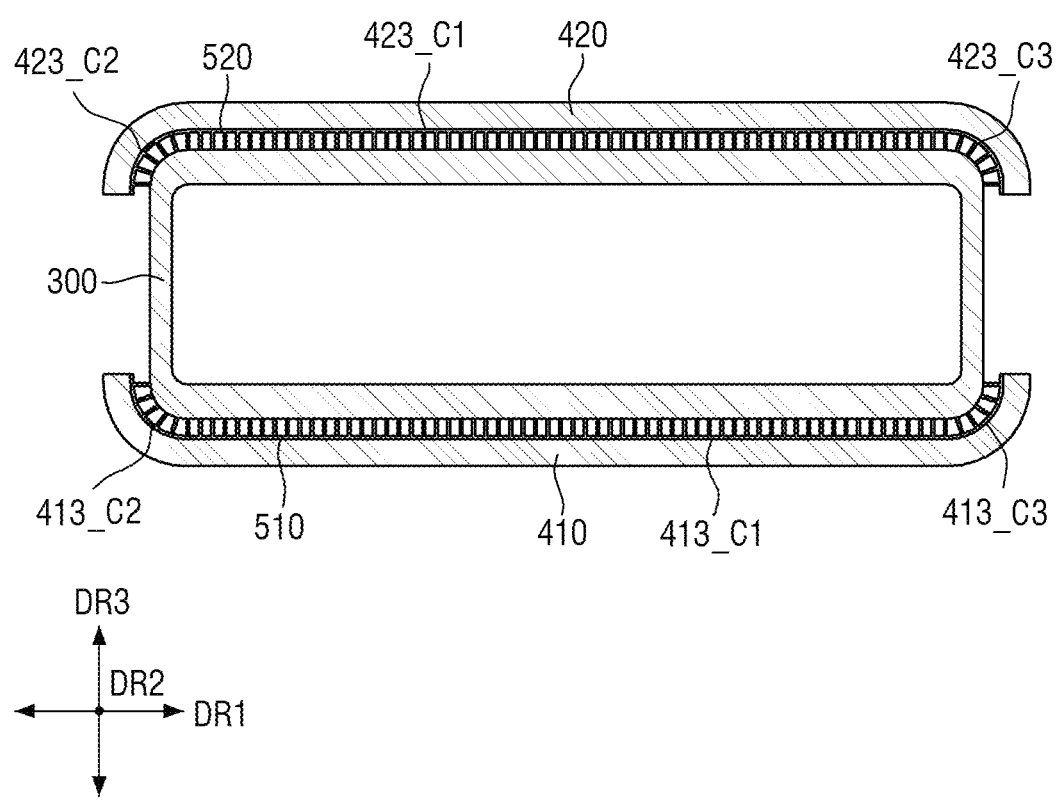
FIG. 10 is a schematic cross-sectional view taken along line C-C' of FIG. 7.

FIG. 8 is a schematic cross-sectional view taken along line A-A' of FIG. 6. FIG. 9 is a schematic cross-sectional view taken along line B-B' of FIG. 7. FIG. 10 is a schematic cross-sectional view taken along line C-C' of FIG. 7.

Referring to FIGS. 8 and 9, the first support member 110 and/or the first rear cover 410 may rotate in a direction with respect to the first rotation axis RX1, and the second support member 120 and/or the second rear cover 420 may rotate in another direction with respect to the second rotation axis RX2. Accordingly, the angle between the first support member 110 and the second support member 120 and/or the angle between the first rear cover 410 and the second rear cover 420 may be varied, and the display device 1 may be folded or unfolded. In FIGS. 8 and 9, the direction may be a clockwise direction, and the another direction may be a counterclockwise direction.

Referring to FIGS. 6 and 8 to 10, as described above, the first blocking member 510 may be disposed on the first cover surface 413 of the first rear cover 410, and the second blocking member 520 may be disposed on the second cover surface 423 of the second rear cover 420. In an embodiment, the first blocking member 510 and the second blocking member 520 may be disposed only on portions of the first cover surface 413 and the second cover surface 423. The portions of the first cover surface 413 and the second cover surface 423 may be portions adjacent to an end of the first rear cover 410 and an end of the second rear cover 420, respectively. As illustrated in FIGS. 8 to 10, the first blocking member 510 and the second blocking member 520 may be curved or bent such that at least portions thereof have a concave or recessed shape corresponding to the shapes of the first cover surface 413 and the second cover surface 423.

Referring to FIG. 8, the rear surface 300_RS of the hinge cover 300 may include a first convex surface 300_RS_C1 and a second convex surface 300_RS_C2. The rear surface 300_RS of the hinge cover 300 may further include a flat surface 300_RS_F between the first convex surface 300_RS_C1 and the second convex surface 300_RS_C2.

In case that the display device 1 is unfolded, the first convex surface 300_RS_C1 and the second convex surface 300_RS_C2 may be overlapped or covered by the first cover surface 413 and the second cover surface 423, respectively. Each of the first convex surface 300_RS_C1 and the second convex surface 300_RS_C2 may have a first curvature radius D1 with respect to the first rotation axis RX1 and the second rotation axis RX2.

The first cover surface 413 and the second cover surface 423 may include a first concave surface 413_C1 and a second concave surface 423_C1, respectively. In some embodiments, each of the first cover surface 413 and the second cover surface 423 may further include a flat surface.

The first concave surface 413_C1 and the second concave surface 423_C1 may have a second curvature radius D2 greater than the first curvature radius D1 with respect to the first rotation axis RX1 and the second rotation axis RX2. The difference between the second curvature radius D2 and the first curvature radius D1 may be the width of the gap G between the first rear cover 410 and the hinge cover 300 and/or the width of the gap G between the second rear cover 420 and the hinge cover 300. The first concave surface 413_C1 and the first convex surface 300_RS_C1 may have the same curvature center, and the second concave surface 423_C1 and the second convex surface 300_RS_C2 may have the same curvature center. For example, the curvature center may be the first rotation axis RX1 and/or the second rotation axis RX2.

The first concave surface 413_C1 may extend from an end of the first rear cover 410 to the rear surface of the first support member 110, and the second concave surface 423_C1 may extend from an end of the second rear cover 420 to the rear surface of the second support member 120. Accordingly, an inner space 410_IS between the first rear cover 410 and the first support member 110 and an inner space 420_IS between the second rear cover 420 and the second support member 120 may be blocked or sealed from the outside.

In case that the display device 1 is unfolded, the first cover surface 413 may face a portion of the rear surface 300_RS of the hinge cover 300, and the second cover surface 423 may face the other portion of the rear surface 300_RS of the hinge cover 300. In some embodiments, even in a folded state of the display device 1, the portions of the first cover surface 413 and the second cover surface 423 may face the rear surface 300_RS of the hinge cover 300. In case that the display device 1 is unfolded, an end of the first cover surface 413 and an end of the second cover surface 423 may contact or be spaced apart from each other.

In case that the display device 1 is unfolded, the first blocking member 510 may be disposed between the rear surface 300_RS of the hinge cover 300 and the first cover surface 413, and the second blocking member 520 may be disposed between the rear surface 300_RS of the hinge cover 300 and the second cover surface 423. In case that the display device 1 is folded, the first blocking member 510 may face the portion of the rear surface 300_RS of the hinge cover 300, and the second blocking member 520 may face the other portion of the rear surface 300_RS of the hinge cover 300. The first blocking member 510 and the second blocking member 520 may contact or be spaced apart from the rear surface 300_RS of the hinge cover 300. In an embodiment, the height of each of the first blocking member 510 and the second blocking member 520 may be equal to or less than a difference between the second curvature radius D2 and the first curvature radius D1. In some embodiments, the height of each of the first blocking member 510 and the second blocking member 520 may be equal to or greater than a difference between the second curvature radius D2 and the first curvature radius D1. In an embodiment, the first blocking member 510 may overlap the first support member 110 in the thickness direction, and the second blocking member 520 may overlap the second support member 120 in the thickness direction.

Referring to FIG. 9, in case that the display device 1 is folded, the first rear cover 410 and the second rear cover 420 may rotate with respect to the first rotation axis RX1 and the second rotation axis RX2, respectively, and the rear surface 300_RS of the hinge cover 300 may be exposed to the outside.

In case that the display device 1 is folded, the distance between the first cover surface 413 and the second cover surface 423 in the first direction DR1 may be greater than that of the display device 1 unfolded. In case that the display device 1 is folded, the exposed area of the rear surface 300_RS of the hinge cover 300 may be greater than that of the display device 1 unfolded. In case that the display device 1 is unfolded, the area of the rear surface 300_RS of the hinge cover 300 covered by the first cover surface 413 and the second cover surface 423 may be greater than that of the display device 1 folded. In some embodiments, in case that the display device 1 is unfolded, the rear surface 300_RS of the hinge cover 300 may be completely covered by the first cover surface 413 and the second cover surface 423. In some embodiments, in case that the display device 1 is unfolded, a portion of the rear surface 300_RS of the hinge cover 300 may be exposed due to a space between the first cover surface 413 and the second cover surface 423.

In case that the display device 1 is folded, the first blocking member 510 may overlap or cover the gap G between a side of the first rear cover 410 and the hinge 200, and the second blocking member 520 may cover the gap G between a side of the second rear cover 420 and the hinge 200. In detail, the first blocking member 510 may cover the gap G between the first cover surface 413 and the first convex surface 300_RS_C1, and the second blocking member 520 may cover the gap G between the second cover surface 423 and the second convex surface 300_RS_C2.

In case that the display device 1 is completely folded, the end of the first blocking member 510 and the end of the second blocking member 520 may contact an end of the first convex surface 300_RS_C1 and an end of the second convex surface 300_RS_C2, respectively. Accordingly, as illustrated in FIG. 9, a closed space formed by the hinge cover 300, the first rear cover 410, the second rear cover 420, the first support member 110, the second support member 120, and the display module DM may be generally sealed from the outside. In case that the display device 1 is completely folded, the first rear cover 410 and the second rear cover 420 may be disposed in parallel and/or the angle between the first rear cover 410 and the second rear cover 420 may be about 0 or about 360 degrees. In some embodiments, in case that the display device 1 is completely folded, the first blocking member 510 and the second blocking member 520 may not overlap the first convex surface 300_RS_C1 and the second convex surface 300_RS_C2, respectively. For example, the first blocking member 510 and the second blocking member 520 may not overlap or cover the first convex surface 300_RS_C1 and the second convex surface 300_RS_C2, respectively. In some embodiments, in case that the display device 1 is completely folded, at least portions of the first blocking member 510 and the second blocking member 520 may overlap the first convex surface 300_RS_C1 and the second convex surface 300_RS_C2, respectively.

In case that the display device 1 is folded, the display module DM may be folded to have a predetermined curvature radius with respect to a predetermined curvature center CC. The folding axis FX may include the curvature center CC of the display module DM. The first curvature radius D1 and/or the second curvature radius D2 may be greater than that of the display module DM.

Referring to FIGS. 8 to 9, an elastic sheet 700 may be disposed between the first support member 110 and the second support member 120. The variable distance between the first support member 110 and the second support member 120 may be overlapped or covered by the elastic sheet 700.

In some embodiments, at least one adhesive layer 610 and at least one adhesive layer 620 may be disposed between the display module DM and the first support member 110 and between the display module DM and the second support member 120, respectively.

In some embodiments, a sub-display module DM' separated from the display module DM may be additionally disposed on the rear surface of the second rear cover 420.

Referring to FIG. 10, the first cover surface 413 of the first rear cover 410 may further include a third concave surface 413_C2 and a fourth concave surface 413_C3 disposed with the first concave surface 413_C1 interposed therebetween, and the second cover surface 423 of the second rear cover 420 may further include a fifth concave surface 423_C2 and a sixth concave surface 423_C3 disposed with the second concave surface 423_C1 interposed therebetween. In an embodiment, the second rear cover 420 may be substantially identical or similar to the first rear cover 410, and thus the third concave surface 413_C2 and the fourth concave surface 413_C3 of the first rear cover 410 will be mainly described below.

The third concave surface 413_C2 and the fourth concave surface 413_C3 may be connected to a side and another side of the first concave surface 413_C1 extending in the second direction DR2, respectively, and may be bent or curved toward the hinge cover 300 and/or the first rotation axis RX1. The third concave surface 413_C2 and the fourth concave surface 413_C3 may overlap or cover at least portions of ends of the hinge cover 300. Accordingly, the third concave surface 413_C2 and the fourth concave surface 413_C3 may overlap the hinge cover 300 in the second direction DR2. In a cross-sectional view, the third concave surface 413_C2 and the fourth concave surface 413_C3 may surround corners of an end and another end of the hinge cover 300. In an embodiment, the first concave surface 413_C1, the third concave surface 413_C2, and the fourth concave surface 413_C3 may be spaced apart from the rear surface 300_RS of the hinge cover 300 to form the gap G, and the first blocking member 510 may overlap or cover the gap G.

The first blocking member 510 may be elongated in the second direction DR2 over the first concave surface 413_C1, the third concave surface 413_C2, and the fourth concave surface 413_C3. Accordingly, in a cross-sectional view, a portion of the first blocking member 510 disposed on the first concave surface 413_C1 may be disposed straight in the second direction DR2, but a portion of the first blocking member 510 disposed on the third concave surface 413_C2 and the fourth concave surface 413_C3 may be bent along the shape of the rear surface 300_RS of the hinge cover 300. In an embodiment, the portions of the first blocking member 510 disposed on the third concave surface 413_C2 and the fourth concave surface 413_C3 may be bent toward the first rotation axis RX1.

In an embodiment, the first concave surface 413_C1 may be curved to have a curvature with respect to an arbitrary axis, e.g., the first rotation axis RX1, in the second direction DR2, and the third concave surface 413_C2 and the fourth concave surface 413_C3 may be curved to have two or more curvatures with respect to two or more axes, e.g., arbitrary axes in the second direction DR2 and the first direction DR1. The third concave surface 413_C2 and the fourth concave surface 413_C3 may include a double curvature surface.

Figure 11:
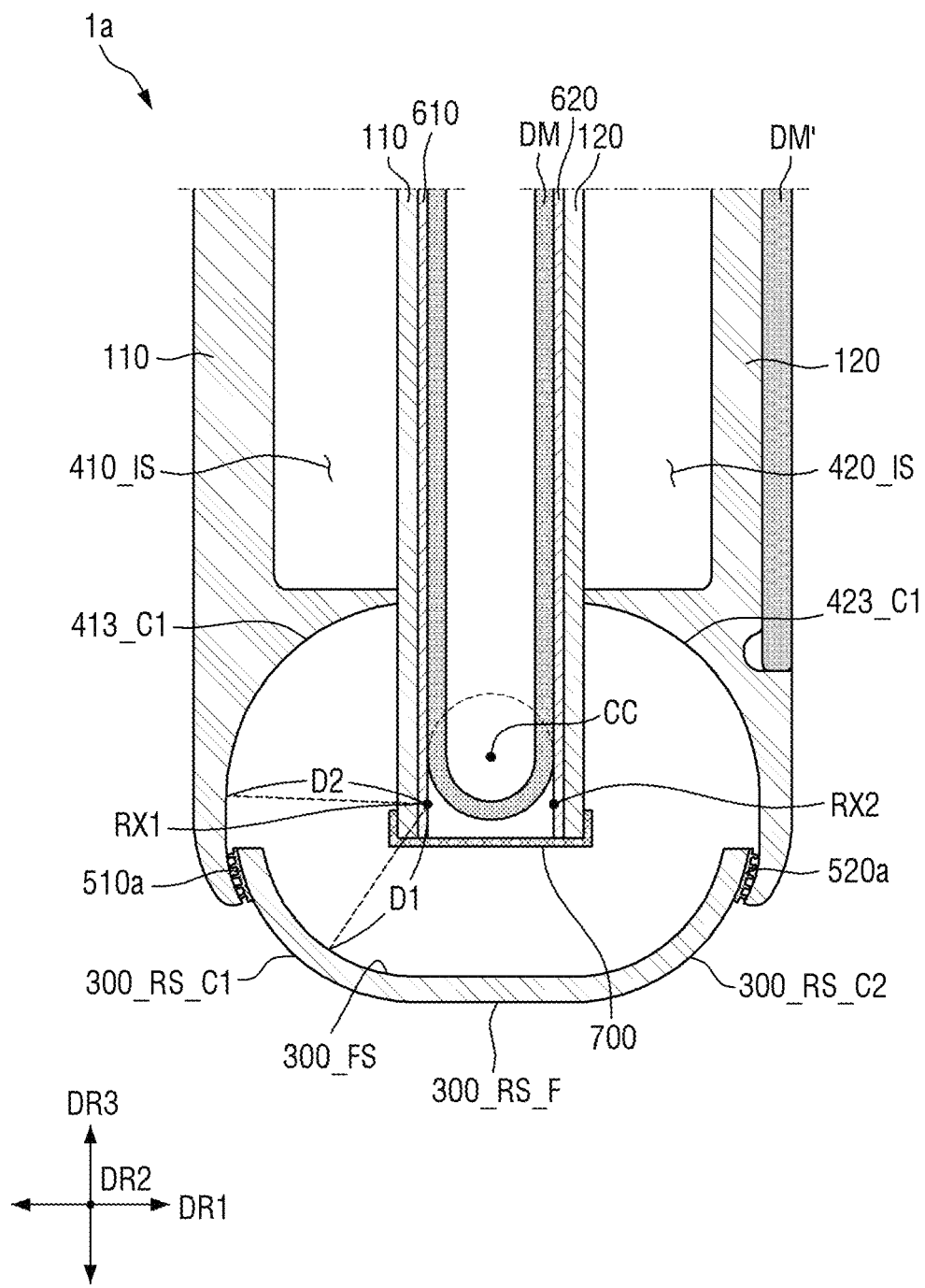
FIG. 11 is a schematic cross-sectional view of a display device according to another embodiment.

FIG. 11 is a schematic cross-sectional view of a display device 1a according to another embodiment.

The embodiment of FIG. 11 is different from the embodiment of FIGS. 5 to 10 with respect to the arrangement of a first blocking member 510a and a second blocking member 520a.

Referring to FIG. 11, the first blocking member 510a and the second blocking member 520a may be disposed on the rear surface 300_RS of the hinge cover 300. In detail, the first blocking member 510a may be disposed on a portion of the rear surface 300_RS of the hinge cover 300, and the second blocking member 520a may be disposed on the other portion (or another portion) of the rear surface 300_RS of the hinge cover 300. The portion and the other portion of the rear surface 300_RS of the hinge cover 300 may be portions overlapped or covered by the first cover surface 413 of the first rear cover 410 and the second cover surface 423 of the second rear cover 420, respectively. In an embodiment, in case that the display device 1 is folded, at least portions of the first cover surface 413 and the second cover surface 423 may overlap at least a portion of the hinge cover 300. In case that the display device 1 is folded, the first blocking member 510a and the second blocking member 520a may be disposed only on portions of the first cover surface 413 and the second cover surface 423 overlapping the first blocking member 510a and the second blocking member 520a in the thickness direction. For example, in case that the display device 1 is folded, the first blocking member 510a and the second blocking member 520a may be disposed only in areas of the rear surface 300_RS of the hinge cover 300 that is not exposed. The areas may respectively be an area adjacent to ends of the first convex surface 300_RS_C1 and an area adjacent to the second convex surface 300_RS_C2 of the hinge cover 300 adjacent to the first rear cover 410 and the second rear cover 420.

Figure 12:
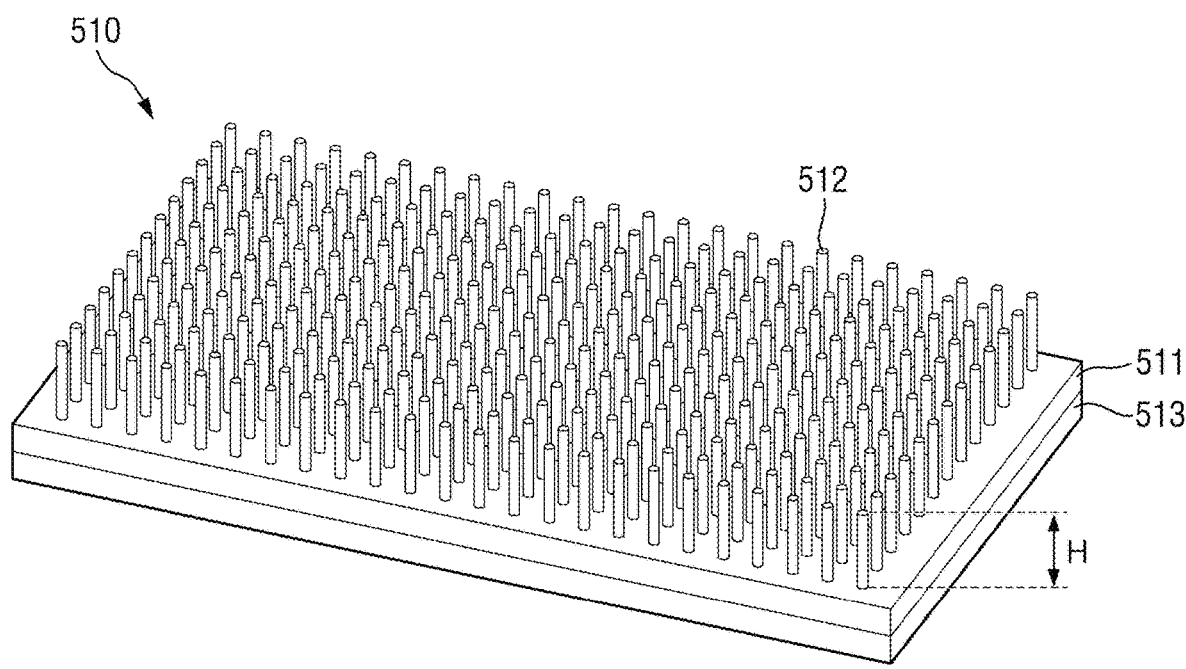
FIG. 12 is a schematic perspective view of a first blocking member of a display device according to an embodiment.
Figure 13:
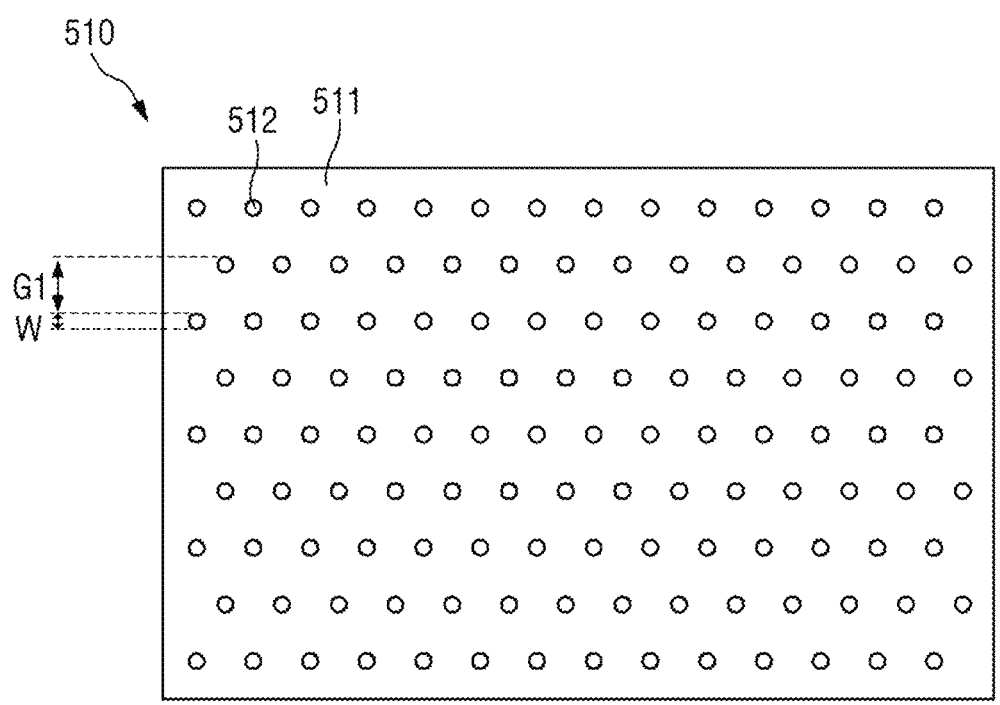
FIG. 13 is a schematic plan view of the first blocking member of the display device according to an embodiment.

FIG. 12 is a schematic perspective view of a first blocking member 510 of a display device 1 according to an embodiment. FIG. 13 is a schematic plan view of the first blocking member 510 of the display device 1 according to an embodiment.

Hereinafter, the first blocking member 510 and the second blocking member 520 will be described in detail. In an embodiment, the first blocking member 510 and the second blocking member 520 are substantially the same or similar, and thus the first blocking member 510 will be mainly described below.

Referring to FIGS. 12 and 13, the first blocking member 510 may include a plate 511 and protrusions 512. The first blocking member 510 may further include an adhesive member 513.

The plate 511 may have a substantially rectangular shape in a plan view. The protrusions 512 may be disposed on a surface of the plate 511, and the other surface (or another surface) of the plate 511 may be attached to the first cover surface 413 of the first rear cover 410. The surface of the plate 511 may be the front surface of the plate 511, and the other surface of the plate 511 may be the rear surface of the plate 511.

As illustrated in FIGS. 8 to 11, the plate 511 may be attached to the first cover surface 413 of the first rear cover 410. In this case, at least a portion of the plate 511 may be bent or curved corresponding to the shape of the first cover surface 413. Specifically, as illustrated in FIGS. 8 and 9, the plate 511 may be curved to have a predetermined curvature radius with respect to an arbitrary axis in the second direction DR2, corresponding to the shape of the first concave surface 413_C1. Accordingly, the front surface of the plate 511 may include a concave shape, and the rear surface of the plate 511 may include a convex shape. The arbitrary axis in the second direction DR2 may include the first rotation axis RX1. Similarly, as illustrated in FIG. 10, portions adjacent to ends of the plate 511 may be bent or curved corresponding to the shapes of the third concave surface 413_C2 and the fourth concave surface 413_C3. Portions of the plate 511 disposed on the second concave surface 423_C1 and the fourth concave surface 413_C3 may have two or more curvatures. Portions of the plate 511 disposed on the second concave surface 423_C1 and the fourth concave surface 413_C3 may include a double curvature surface.

The protrusions 512 may be disposed on the surface of the plate 511. As illustrated in FIG. 13, the protrusions 512 may be disposed at regular intervals on the surface of the plate 511.

The protrusions 512 may form rows and/or columns. In an embodiment, the protrusions 512 may form rows extending in a direction. The direction may include a direction parallel to a side of the first rear cover 410, the direction of the folding axis FX, and the second direction DR2.

Referring to FIG. 13, the protrusions 512 of one of the rows and the protrusions 512 of another row adjacent to the row may be disposed alternately with each other. For example, the protrusions 512 of a first row disposed on the upper side of FIG. 13 and the protrusions 512 of a second row adjacent to the first row and disposed immediately below the first row may be disposed alternately with each other in the other direction. The other direction may be a direction intersecting the direction in which the rows extend. In an embodiment, the other direction may be perpendicular to the direction.

The protrusions 512 may form columns extending in the other direction. In some embodiments, the protrusions 512 of a third row disposed immediately below the second row may form columns with the protrusions 512 of the first row.

In some embodiments, the direction and the other direction may be a direction intersecting the direction in which the side of the first rear cover 410 extends, the direction of the folding axis FX, and/or the second direction DR2. For example, the direction and/or the other direction may intersect the direction in which the side of the first rear cover 410 extends, the direction of the folding axis FX, and/or the second direction DR2 at an angle of about 45 degrees.

The protrusions 512 may have a substantially circular shape in a plan view but are not limited thereto. In some embodiments, the protrusions 512 may have any various shape(s) such as a triangle, a quadrangle, a rhombus, a trapezoid, a hexagon, or an ellipse in a plan view. A diameter W of the protrusions 512 may be equal to or less than the width of the gap G between the first rear cover 410 and the hinge cover 300. For example, the diameter W of the protrusions 512 may be equal to or less than one third of the width of the gap G. In an embodiment, the diameter W of the protrusions 512 may be equal to or less than about 0.5 mm. In this case, the width of the gap G between the first rear cover 410 and the hinge cover 300 may be about 1.5 mm. In some embodiments, the diameter W of the protrusions 512 may be equal to or less than about 1.0 mm. The diameter W of the protrusions 512 may have a size in micrometers. In some embodiments, the diameter W of the protrusions 512 may be about 1 μm to about 1,000 μm.

The protrusions 512 may have a structure such as that of a brush and/or filter in which base materials are aggregated. For example, a hundred to a million of the protrusions 512 may be disposed on the surface of the plate 511. The first blocking member 510 and the second blocking member 520 may block foreign substances but may form a passage through which air passes. For example, the passage may function as a passage for regulating a pressure in the display device 1 and/or a passage for dissipating heat from the display device 1.

The distance G1 between the protrusions 512 may be equal to or less than the width of the gap G between the first rear cover 410 and the hinge cover 300. The distance G1 between the protrusions 512 may be equal to or greater than the diameter W of the protrusions 512. For example, the diameter W of the protrusions 512 may be equal to or greater than one third of the width of the gap G and equal to or less than two thirds of the width of the gap G. The distance G1 between the protrusions 512 may be a distance between columns or a distance between rows. In an embodiment, the distance between the protrusions 512 in the direction and/or the other direction may be equal to or less than about 1.0 mm. In this case, the diameter W of the protrusions 512 is about 0.5 mm, and the width of the gap G between the first rear cover 410 and the hinge cover 300 may be about 1.5 mm.

In case that the distance G1 between the protrusions 512 is greater than or equal to the diameter W of the protrusions 512, the protrusions 512 may be disposed not to overlap each other in the direction and/or the other direction.

A height H of the protrusions 512 may be equal to or greater than the diameter W of the protrusions 512 and/or the distance G1 between the protrusions 512. For example, the height H of the protrusions 512 may be about two to four times the diameter and about one to two times the distance. The height H of the protrusions 512 may be equal to or less than the width of the gap G between the first rear cover 410 and the hinge cover 300. In an embodiment, the height H of the protrusions 512 may be equal to or less than about 1.5 mm. In some embodiments, the sum of the height H of the protrusions 512 and the thickness of the plate 511 may be equal to or less than about 1.5 mm.

The plate 511 and the protrusions 512 may be integrally injection-molded. The plate 511 and the protrusions 512 may include an injection-moldable material. The material may include a material having elasticity and/or flexibility. For example, the plate 511 may include at least one of silicon or plastic. The plastic may include polyethylene, polypropylene, polystyrene, polyethylene terephthalate, polyamide, polyester, polyvinyl chloride, polyurethane, polycarbonate, and polyvinylidene chloride.

Figure 14:
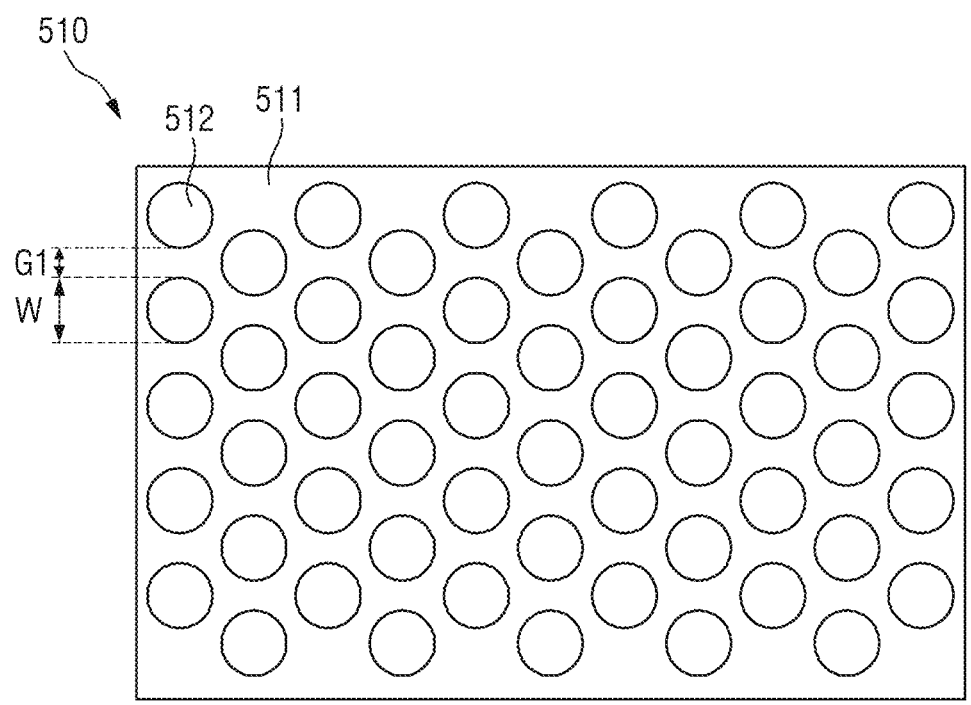
FIG. 14 is a schematic plan view of a first blocking member of a display device according to another embodiment.

FIG. 14 is a schematic plan view of a first blocking member 510 of a display device 1 according to another embodiment.

In the embodiment of FIG. 14, the relationship between the diameter W of the protrusions 512 and the distance G1 between the protrusions 512 is different from that of the embodiment of FIG. 13.

Referring to FIG. 14, the diameter W of the protrusions 512 may be greater than the distance G1 between the protrusions 512. Specifically, the diameter W of the protrusions 512 may be greater than the distance between the protrusions 512 in a direction and/or the other direction. Accordingly, the protrusions 512 may overlap each other in the direction and/or the other direction. The direction and the other direction may be a direction in which rows extend and a direction in which columns extend, respectively. For example, the direction may be a direction from left to right in FIG. 14, and the other direction may be a direction from top to bottom in FIG. 14. In an embodiment, the diameter W of the protrusions 512 is about 0.5 mm, and the distance G1 between the protrusions 512 may be less than about 0.5 mm.

The embodiment of FIG. 14 is substantially identical or similar to the embodiment of FIG. 13 except for the relationship between the diameter W of the protrusions 512 and the distance G1 between the protrusions 512, and thus a repeated description will be omitted below.

FIGS. 15A to 15E are schematic cross-sectional views of a first blocking member 510 of a display device 1 according to various embodiments.

Referring to FIGS. 12 to 15E, the protrusions 512 may have various cross-sectional shapes.

Figure 15A:
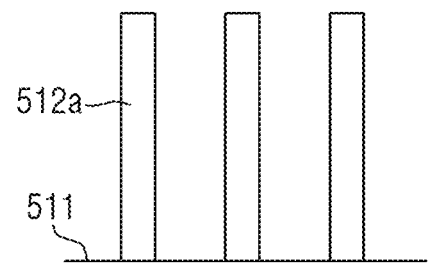
FIGS. 15A to 15E is a schematic cross-sectional view of a first blocking member of a display device according to various embodiments.

Referring to FIG. 15A, protrusions 512a may have a pillar shape protruding from the plate 511. Each of the protrusions 512a may include a circular or polygonal column. In an embodiment, the protrusions 512a may protrude to have a predetermined width from the surface of the plate 511. An end of each of the protrusions 512a may have a substantially rectangular shape.

Figure 15B:
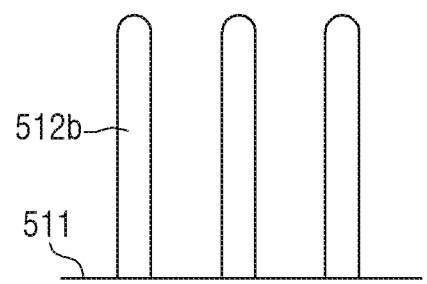

Referring to FIG. 15B, protrusions 512b may have a rounded end unlike that of FIG. 15A. Accordingly, the area of each of the protrusions 512b contacting the rear surface 300_RS of the hinge cover 300 may be reduced.

Figure 15C:
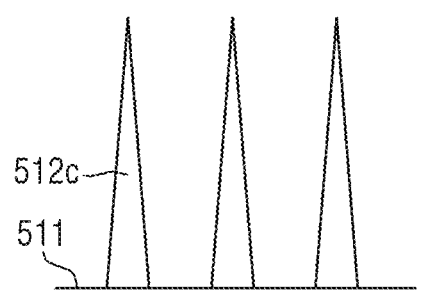

Referring to of FIG. 15C, each of protrusions 512c may have a triangular shape in a cross-sectional view. The width and/or diameter of each of the protrusions 512c may decrease as it is farther from the plate 511. An end of each of the protrusions 512c may include a pointed peak. Each of the protrusions 512c may have a shape such as a cone, a triangular pyramid, a square pyramid, or a polygonal pyramid.

Figure 15D:
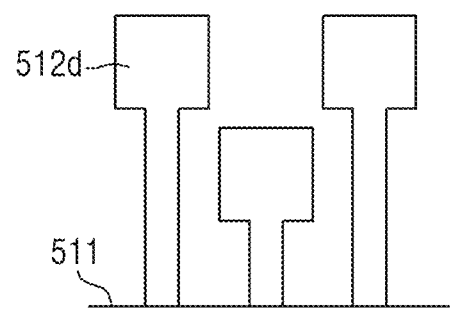

Referring to FIG. 15D, the width and/or diameter of each of protrusions 512d may increase as it is farther from the plate 511. Each of the protrusions 512d may include a head at an end thereof. Accordingly, the area of the protrusions 512d contacting the rear surface 300_RS of the hinge cover 300 may increase. The protrusion 512d may have a different height from other neighboring protrusions 512d. Similarly, the protrusions 512a, 512b, 512c, and 512e of the embodiments of FIGS. 15A to 15C and 15E may have different heights from each other.

Figure 15E:
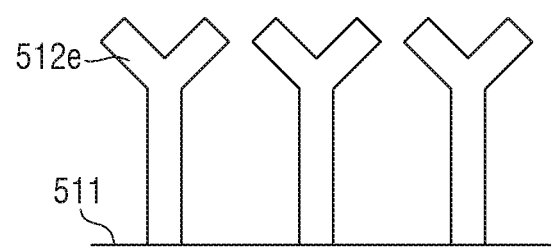

Referring to FIG. 15E, the each of protrusions 512e may include at least one branch portion at an end thereof. In an embodiment, the cross section of the protrusions 512e may have a Y-shape but is not limited thereto.

Figure 16:
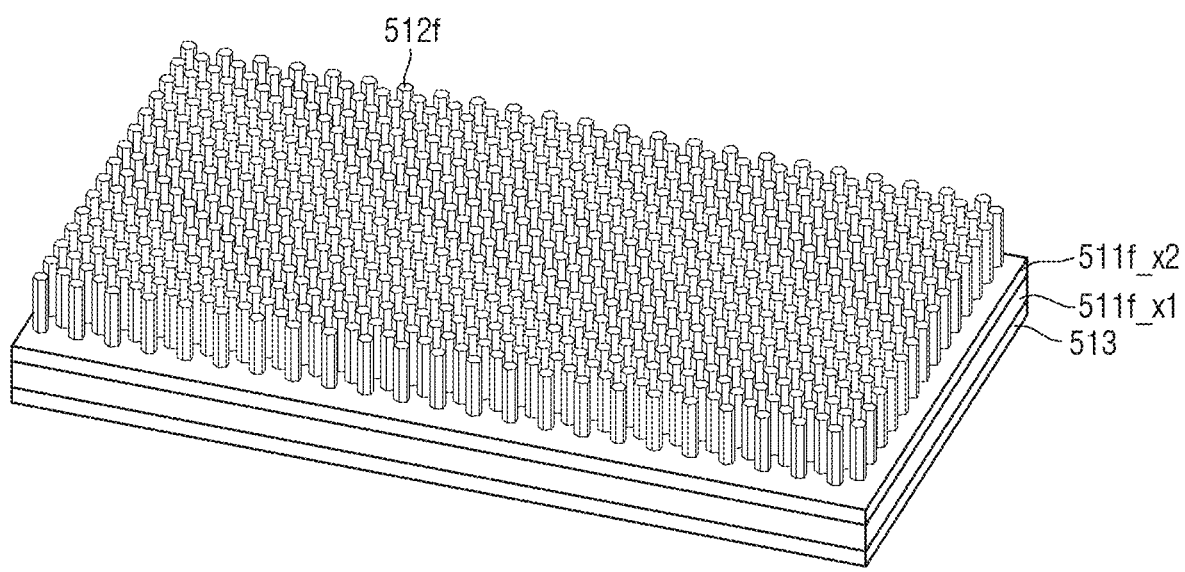
FIG. 16 is a schematic perspective view of a first blocking member of a display device according to another embodiment.
Figure 17:
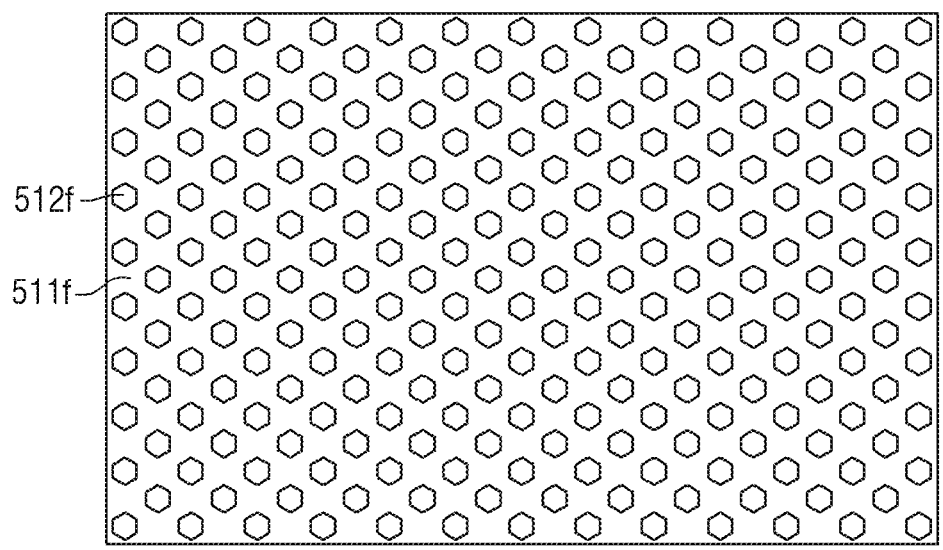
FIG. 17 is a schematic plan view of a first blocking member of a display device according to another embodiment.

FIG. 16 is a schematic perspective view of a first blocking member 510 of a display device 1 according to another embodiment. FIG. 17 is a schematic plan view of a first blocking member 510 of a display device 1 according to another embodiment.

The embodiment of FIG. 16 is different from the embodiment of FIG. 12 in that the protrusions 512 include nanowires.

Referring to FIGS. 16 and 17, the protrusions 512 may include nanowires. Each of the nanowires may refer to a wire structure having a size in nanometers. For example, the diameter of the nanowire may be about 1 nm to about 1,000 nm. In an embodiment, the nanowires 512f may be formed using epitaxial growth. The epitaxial growth may refer to a phenomenon in which a crystalline film having directionality grows on a substrate or layer. The epitaxial growth may include chemical vapor deposition (CVD), liquid-phase epitaxy (LPE), molecular beam epitaxy (MBE), or the like.

The plate 511f may include a first layer 511f_x1 including indium phosphide and a second layer 511f_x2 disposed on the first layer 511f_x1 and including silicon dioxide. The plate 511 may further include the adhesive member 513 under the first layer.

In an embodiment, the nanowire may be grown by a selective area epitaxy (SAE) method. In detail, the first layer may be masked with the second layer including patterned openings, and the nanowire may be synthesized using a vapor-liquid-solid (VLS) or vapor-solid growth mechanism in which nanoparticles are used as a catalyst to continuously feed one-dimensional material growth.

Figure 18:
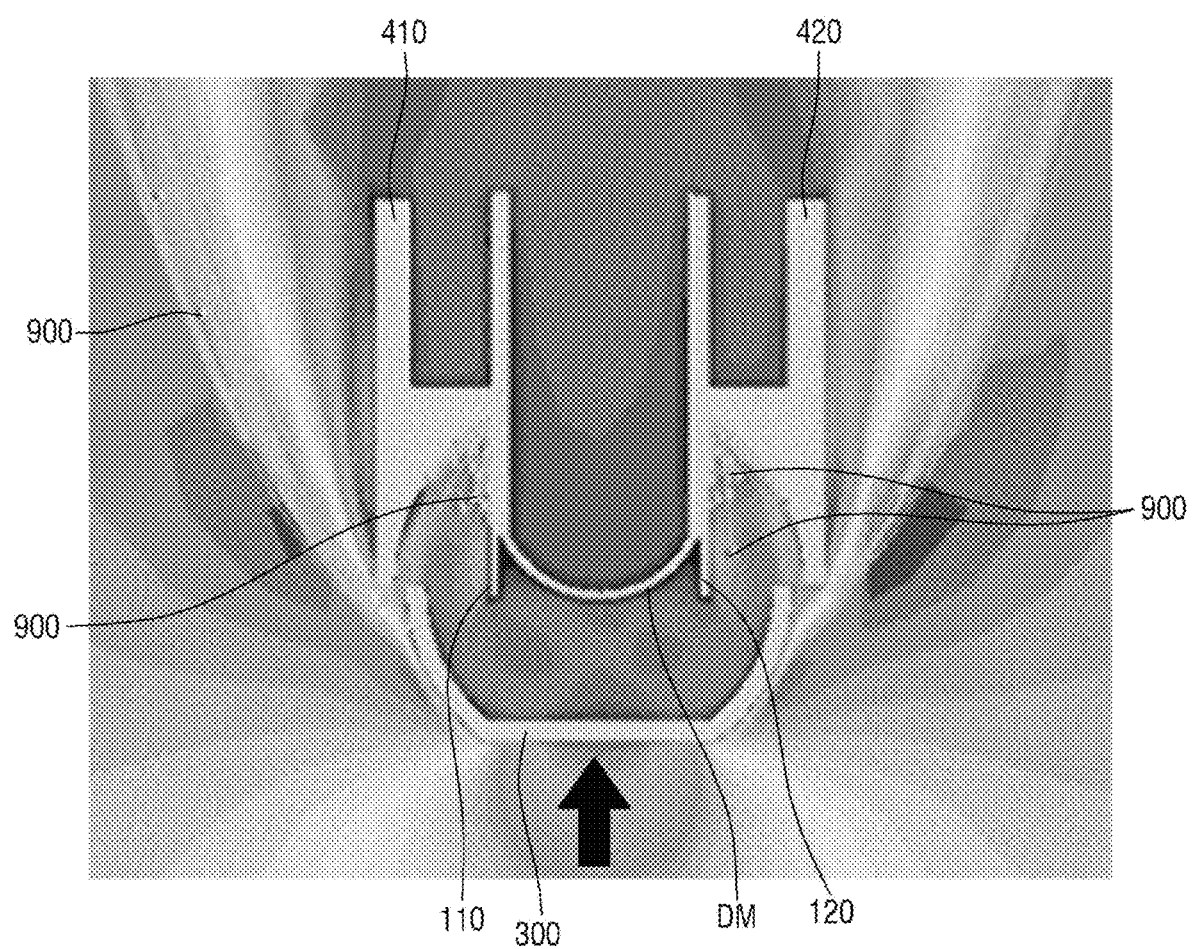
FIG. 18 is a schematic diagram illustrating a simulation result of a display device in which the first blocking member and the second blocking member are not disposed.
Figure 19:
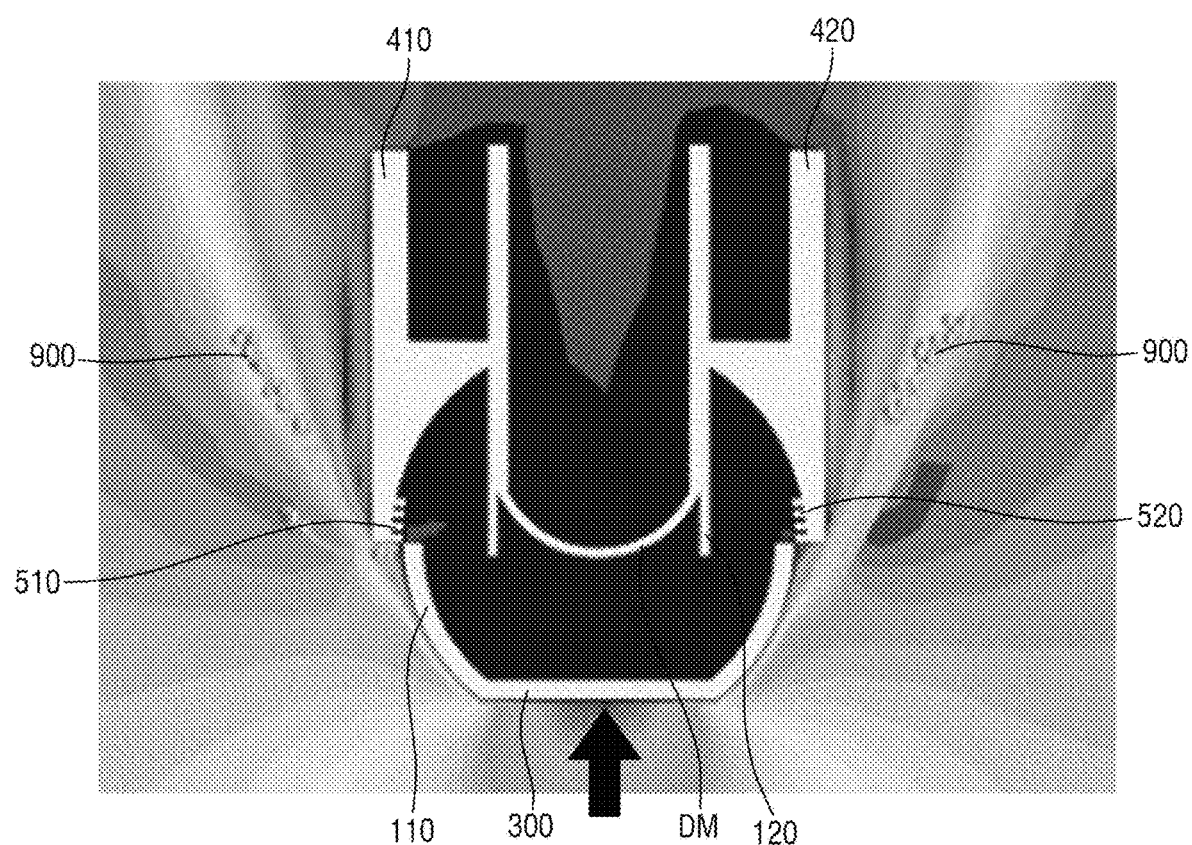
FIG. 19 is a schematic diagram illustrating a simulation result of a display device according to an embodiment.

FIG. 18 is a diagram illustrating a simulation result of a display device 1 in which the first blocking member 510 and the second blocking member 520 are not disposed. FIG. 19 is a diagram illustrating a simulation result of a display device 1 according to an embodiment.

FIGS. 18 and 19 illustrate the results obtained by simulating whether foreign substances invade by using a computer in case that a fluid containing the foreign substances flows toward the hinge cover 300 of the display device 1. In this simulation, the height H of the protrusions 512 was set to 1.5 mm, and the distance between the protrusions 512 was set to 0.5 mm.

Referring to FIG. 18, in case that the first blocking member 510 and the second blocking member 520 are not disposed, it can be seen that a large amount of foreign substances are introduced into the gaps G between the first rear cover 410 and the hinge cover 300 and between the second rear cover 420 and the hinge cover 300. As described above, the invading foreign substances may cause a breakdown and/or malfunction of the display device 1.

Referring to FIG. 19, in case that the first blocking member 510 and the second blocking member 520 are disposed, it can be seen that foreign substances are hardly introduced into the display device 1 as the gaps G between the first rear cover 410 and the hinge cover 300 and between the second rear cover 420 and the hinge cover 300 are substantially blocked. For example, as a result of computer simulation, in case that the first blocking member 510 and the second blocking member 520 are disposed, 99% or more of foreign substances from the outside may be blocked.

Figure 20:
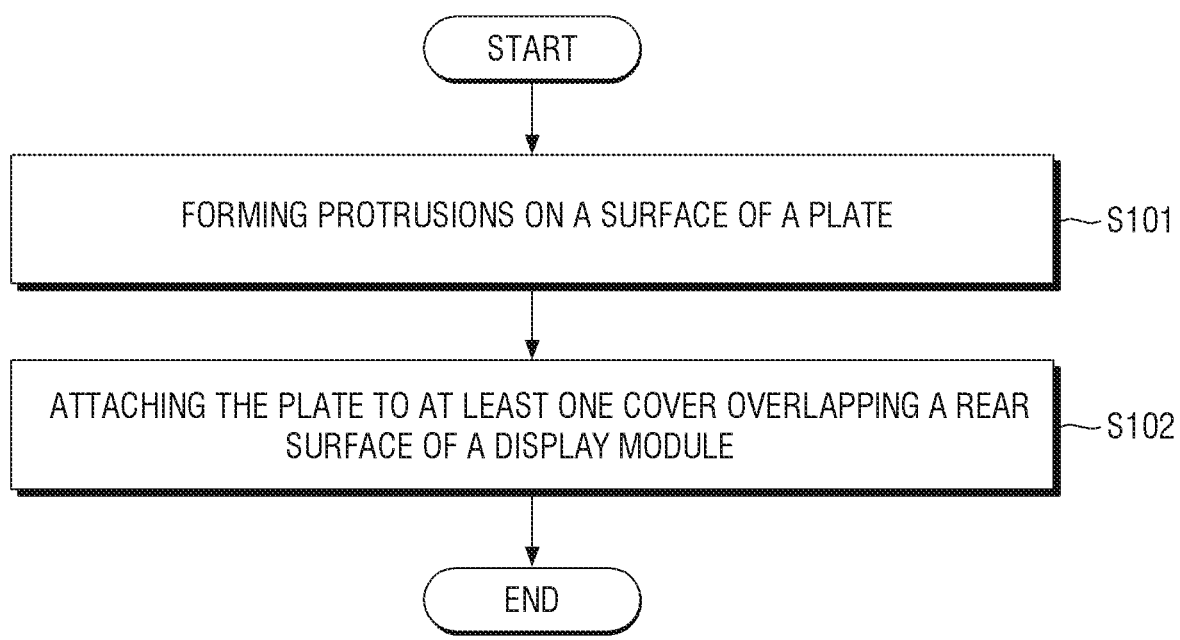
FIG. 20 is a schematic flowchart of a method of manufacturing a display device according to an embodiment.

FIG. 20 is a schematic flowchart of a method of manufacturing a display device 1 according to an embodiment.

The display device 1 manufactured by the method of manufacturing the display device 1 may include the embodiments of FIGS. 1 to 18.

Referring to FIG. 20, the method of manufacturing the display device 1 may include forming the protrusions 512 on a surface of the plate 511 (S101) and attaching the plate 511, on which the protrusions 512 are formed, to at least one cover that overlaps or covers the rear surface of the display module DM (S102).

The step of forming the protrusions 512 may include integrally injection-molding the protrusions 512 and the plate 511, and epitaxially growing the protrusions 512 on the surface of the plate 511.

The step of integrally injection-molding the protrusions 512 and the plate 511 may include melting a material including silicon and/or plastic, injecting the molten material into a mold, cooling the mold, and taking out the plate 511 on which the protrusions 512 are formed from the mold, and finish-processing the plate 511 on which the protrusions 512 are formed.

The step of epitaxially growing the protrusions 512 may include preparing a first layer including indium phosphide, depositing a second layer including openings on the first layer, and growing the protrusions 512 through the openings by supplying nanoparticles.

The step of attaching the plate 511 on which the protrusions 512 are formed, to the at least one cover may include attaching the first plate 511 to the first cover surface 413 of the first rear cover 410 that is disposed on the side of the hinge cover 300 and attaching the second plate 511 to the second cover surface 423 of the second rear cover 420 that is disposed on the other side of the hinge cover 300.

The method of manufacturing the display device 1 may further include disposing the adhesive member 513 on the other surface of the plate 511 and bending the plate 511 corresponding to the shape of the at least one cover.

The method of manufacturing the display device 1 may not include at least part of the above steps or may include one or more other steps with reference to FIGS. 1 to 17.

In concluding the detailed description, those skilled in the art will appreciate that many variations and modifications can be made to the embodiments without substantially departing from the principles of the disclosure. Therefore, the disclosed embodiments of the disclosure are used in a generic and descriptive sense only and not for purposes of limitation.

What is claimed is:

1. A display device comprising:
 a display panel including:
  a front surface displaying an image;
  a rear surface opposite to the front surface of the display panel; and
  a folding axis;
 a support member disposed on the rear surface of the display panel, the support member including:
  a first support member disposed on a side of the folding axis; and
  a second support member separated from the first support member and disposed on another side of the folding axis;
 a hinge connected to the first support member and the second support member;
 a hinge cover disposed over the hinge, the hinge cover including:
  a front surface facing the hinge; and
  a rear surface opposite to the front surface of the hinge cover;

a first rear cover disposed on a rear surface of the first support member, the first rear cover including a first cover surface that covers a first area of the rear surface of the hinge cover in an unfolded state;

a second rear cover disposed on a rear surface of the second support member, the second rear cover including a second cover surface that covers a second area of the rear surface of the hinge cover in the unfolded state;

a first blocking member attached to the first cover surface of the first rear cover, the first blocking member including a plurality of first protrusions; and a second blocking member attached to the second cover surface of the second rear cover, the second blocking member including a plurality of second protrusions.

2. The display device of claim 1, wherein
the first blocking member includes a first plate including a surface on which the plurality of first protrusions are disposed, and
the second blocking member includes a second plate including a surface on which the plurality of second protrusions are disposed.

3. The display device of claim 2, further comprising:
a first adhesive member disposed between another surface of the first plate and the first cover surface; and
a second adhesive member disposed between another surface of the second plate and the second cover surface.

4. The display device of claim 1, wherein the plurality of first protrusions and the plurality of second protrusions have a diameter equal to or less than about 0.5 mm.

5. The display device of claim 1, wherein
the plurality of first protrusions and the plurality of second protrusions form a plurality of rows in a direction, and
protrusions of a first row among the plurality of rows and protrusions of a second row among the plurality of rows are disposed alternately with each other.

6. The display device of claim 1, wherein
a distance between the plurality of first protrusions is equal to or less than a distance between the rear surface of the hinge cover and the first cover surface, and
a distance between the plurality of second protrusions is equal to or less than a distance between the rear surface of the hinge cover and the second cover surface.

7. The display device of claim 6, wherein each of the distance between the plurality of first protrusions and the distance between the plurality of second protrusions is equal to or less than about 1.0 mm.

8. The display device of claim 1, wherein
the first blocking member covers a gap between the rear surface of the hinge cover and the first cover surface, and
the second blocking member covers a gap between the rear surface of the hinge cover and the second cover surface.

9. The display device of claim 8, wherein
the plurality of first protrusions have a height equal to or less than a distance between the rear surface of the hinge cover and the first cover surface, and
the plurality of second protrusions have a height equal to or less than a distance between the rear surface of the hinge cover and the second cover surface.

10. The display device of claim 9, wherein the plurality of first protrusions and the plurality of second protrusions have a height equal to or less than about 1.5 mm.

11. The display device of claim 1, wherein
the first blocking member is disposed between the rear surface of the hinge cover and the first cover surface, and
the second blocking member is disposed between the rear surface of the hinge cover and the second cover surface.

12. The display device of claim 1, wherein
the first cover surface and the second cover surface include curved surfaces, respectively, and
the first blocking member and the second blocking member are curved corresponding to shapes of the curved surfaces of the first cover surface and the curved surface of the second cover surface, respectively.

13. The display device of claim 12, wherein
the rear surface of the hinge cover has a convex shape, and
the first cover surface and the second cover surface have a concave shape corresponding to the convex shape of the rear surface of the hinge cover.

14. The display device of claim 1, wherein the first blocking member and the second blocking member include at least one of silicon or plastic.

15. The display device of claim 1, wherein the rear surface of the hinge cover is exposed between the first rear cover and the second rear cover in a folded state.

16. A display device comprising:
a display panel including:
a folding area;
a first non-folding area disposed on a side of the folding area; and
a second non-folding area disposed on another side of the folding area;
a first cover disposed in the folding area;
a second cover disposed in the first non-folding area, the second cover including a side adjacent to the first cover and separated from the first cover;
a third cover disposed in the second non-folding area, the third cover including a side adjacent to the first cover and separated from the first cover;
a first blocking member attached to the side of the second cover and covering a gap between the first cover and the side of the second cover; and
a second blocking member attached to the side of the third cover and covering a gap between the first cover and the side of the third cover.

17. The display device of claim 16, wherein each of the first blocking member and the second blocking member includes a plate and a plurality of protrusions protruding from a surface of the plate.

18. The display device of claim 17, wherein the plurality of protrusions have a diameter equal to or less than about 0.5 mm.

19. The display device of claim 16, wherein
the first cover includes a front surface facing the display panel and a rear surface opposite to the front surface of the first cover,
the second cover includes a first cover surface covering a portion of the rear surface of the first cover, and
the third cover includes a second cover surface covering another portion of the rear surface of the first cover.

20. The display device of claim 19, wherein
the first blocking member is disposed on the first cover surface of the second cover and covers a gap between the rear surface of the first cover and the first cover surface of the second cover, and
the second blocking member is disposed on the second cover surface of the third cover and covers a gap between the rear surface of the first cover and the second cover surface of the third cover.

21. A method of manufacturing a display device, comprising:
   forming a plurality of protrusions on a surface of a plate; and
   attaching the plate to at least one cover, the at least one cover covering a rear surface of a hinge cover of a display module,
   wherein the forming of the plurality of protrusions comprises performing an injection molding or epitaxial growth to form the plurality of protrusions.

22. The display device of claim 1, wherein in case that the display device is folded, the first blocking member and the second blocking member are spaced apart from each other.

* * * * *